United States Patent
Green et al.

(10) Patent No.: US 10,713,883 B2
(45) Date of Patent: Jul. 14, 2020

(54) DYNAMIC VIRTUAL SCRATCH CARD GAMING SYSTEM

(71) Applicant: HIGHLIGHT GAMES LIMITED, London (GB)

(72) Inventors: Timothy Patrick Jonathan Green, Surrey (GB); Steven John Holmes, Lincolnshire (GB); Stewart James Whittle, Hertfordshire (GB); Nick Gardiner, London (GB)

(73) Assignee: Highlight Games Limited, London (GB)

( * ) Notice: Subject to any disclaimer, the term of this patent is extended or adjusted under 35 U.S.C. 154(b) by 81 days.

(21) Appl. No.: 16/107,394

(22) Filed: Aug. 21, 2018

(65) Prior Publication Data
US 2020/0066090 A1    Feb. 27, 2020

(51) Int. Cl.
*G06F 17/00*    (2019.01)
*G07F 17/32*    (2006.01)
*G06F 16/78*    (2019.01)
*G06F 16/28*    (2019.01)

(52) U.S. Cl.
CPC ........ *G07F 17/3213* (2013.01); *G06F 16/283* (2019.01); *G06F 16/7867* (2019.01); *G07F 17/329* (2013.01); *G07F 17/3209* (2013.01)

(58) Field of Classification Search
None
See application file for complete search history.

(56) References Cited

U.S. PATENT DOCUMENTS

| | | | | |
|---|---|---|---|---|
| 7,946,926 B1* | 5/2011 | Balardeta | ........... | A63B 69/3623 473/222 |
| 2002/0123386 A1* | 9/2002 | Perlmutter | ......... | A63B 24/0021 473/223 |
| 2004/0124243 A1* | 7/2004 | Gatto | ..................... | G06Q 30/02 235/487 |
| 2005/0259002 A1* | 11/2005 | Erario | ................ | A63B 24/0021 342/357.61 |
| 2006/0148590 A1* | 7/2006 | Sullivan | ............. | A63B 37/0003 473/371 |
| 2008/0207357 A1* | 8/2008 | Savarese | ............ | A63B 24/0021 473/407 |
| 2009/0029754 A1* | 1/2009 | Slocum | .............. | A63B 24/0087 463/5 |
| 2009/0280891 A1* | 11/2009 | Filipour | .................. | G07F 17/32 463/22 |

(Continued)

*Primary Examiner* — Paul A D'Agostino
(74) *Attorney, Agent, or Firm* — Patent Ingenuity, P.C.; Samuel K. Simpson

(57) ABSTRACT

A system has a pre-recorded content database. Further, the system has a processor that establishes a virtual scratch card game, randomly determines a plurality of positions in a virtual scratch card grid that correspond to a winning outcome of the virtual scratch card game, searches for a plurality of pre-recorded video clips in the pre-recorded content database such that each of the plurality of pre-recorded video clips displays an event corresponding to the winning outcome, and provides the plurality of pre-recorded video clips to a display device that renders the virtual scratch card grid according to a plurality of scratch-off blocks that, when activated, reveal each of the plurality of pre-recorded video clips at each of the corresponding plurality of positions.

16 Claims, 20 Drawing Sheets

(56) References Cited

U.S. PATENT DOCUMENTS

| | | | |
|---|---|---|---|
| 2010/0277617 A1* | 11/2010 | Hollinger | H04N 5/2252 348/231.99 |
| 2010/0285903 A1* | 11/2010 | Nicodem | A63B 37/0003 473/404 |
| 2012/0142443 A1* | 6/2012 | Savarese | A63B 71/06 473/199 |
| 2012/0244969 A1* | 9/2012 | Binder | A63H 33/18 473/570 |
| 2013/0144411 A1* | 6/2013 | Savarese | G06F 17/40 700/91 |
| 2013/0196789 A1* | 8/2013 | Kim | A63B 37/0082 473/373 |
| 2013/0203518 A1* | 8/2013 | Hatton | A63B 53/047 473/223 |
| 2013/0210563 A1* | 8/2013 | Hollinger | H04N 5/2252 473/570 |
| 2013/0250047 A1* | 9/2013 | Hollinger | H04N 5/2252 348/36 |
| 2013/0274040 A1* | 10/2013 | Coza | A63B 24/0062 473/570 |
| 2014/0243069 A1* | 8/2014 | Hoffman | G07F 17/34 463/20 |
| 2014/0260637 A1* | 9/2014 | Molinari | G01B 7/003 73/646 |
| 2014/0266160 A1* | 9/2014 | Coza | G01B 7/003 324/207.11 |
| 2014/0328576 A1* | 11/2014 | Debarros | G11B 27/031 386/282 |
| 2015/0105172 A1* | 4/2015 | Thurman | A63B 69/3658 473/199 |
| 2015/0105173 A1* | 4/2015 | Thurman | G09B 19/0038 473/199 |
| 2015/0279156 A1* | 10/2015 | Omar | G06Q 30/06 463/22 |
| 2016/0012465 A1* | 1/2016 | Sharp | G06Q 20/18 705/14.17 |
| 2016/0071366 A1* | 3/2016 | Lind | G07F 17/3225 463/6 |
| 2016/0279471 A1* | 9/2016 | Holzapfel | G08B 13/1427 |
| 2016/0303443 A1* | 10/2016 | Boggs | A63B 69/3685 |
| 2016/0317896 A1* | 11/2016 | Albelo | A63B 69/3614 |

* cited by examiner

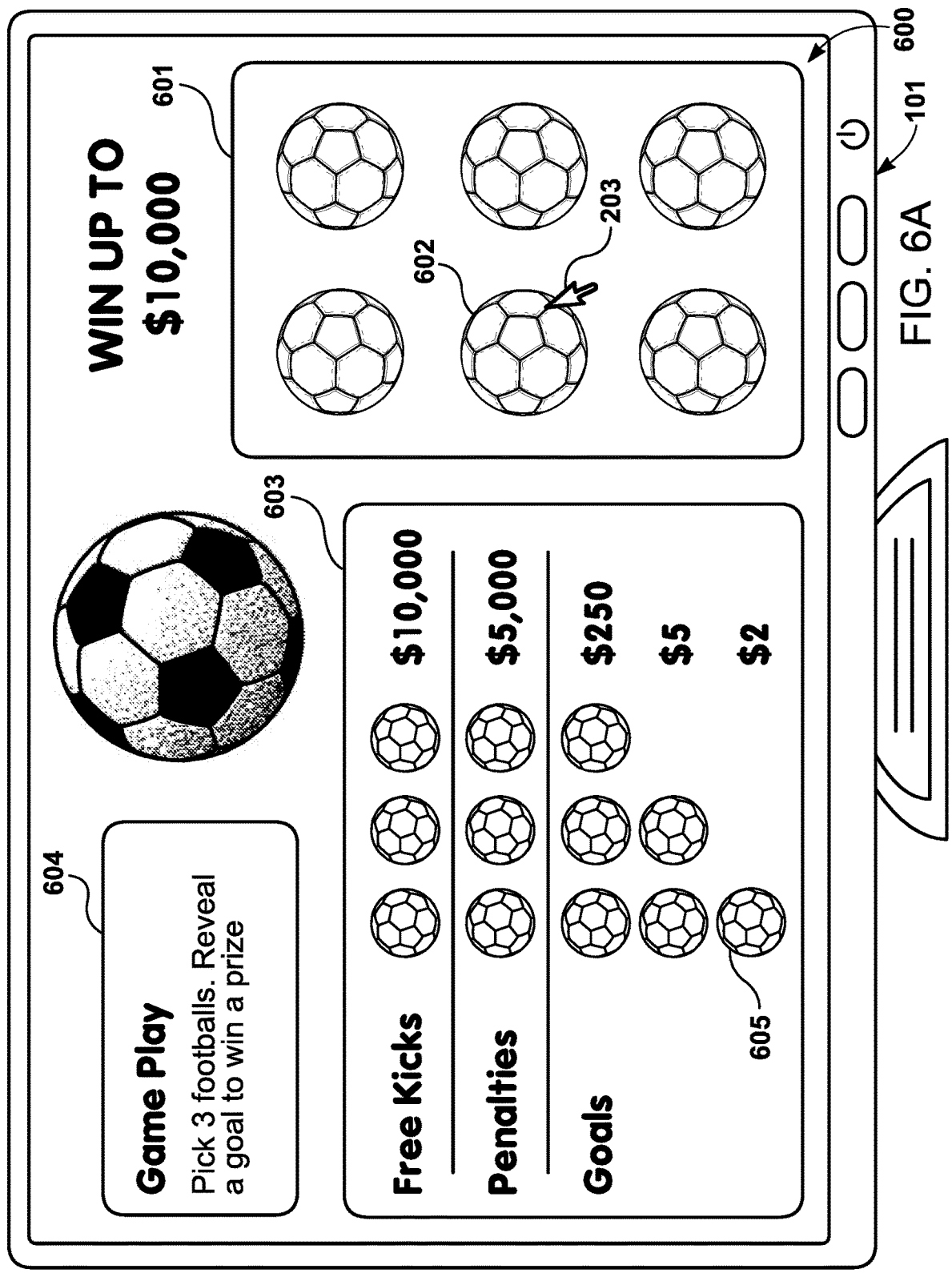

DYNAMIC VIRTUAL SCRATCH CARD GAMING SYSTEM

BACKGROUND

1. Field

This disclosure generally relates to the field of wager-based, computerized gaming systems. More particularly, the disclosure relates to a wager-based, virtual scratch card gaming system.

2. General Background

A variety of conventional wager-based games (e.g., lottery games) require a waiting period for a winning indicium (e.g., lottery number) to be drawn prior to a prize being awarded. For example, a player may have to wait a week, or at least several days, for a draw of a winning indicium.

To reduce the waiting time of the aforementioned games, conventional instant-based games allow a user to instantly determine if a game has been won. For instance, a pre-printed scratch card may block the game parameters (e.g., game symbols, numbers, etc.) with a film of material that may be physically scratched off (e.g., with a physical coin) by the player. Alternatively, a pull-tab may be adhered to the pre-printed card to allow a player to pull a material off of the card to reveal the game parameters.

Yet, conventional scratch games, whether pre-printed or online, are limited to providing static-based game parameters. In other words, the game symbols, which are blocked from viewing prior to game play, do not change after they are unblocked. For example, a row of banana symbols may be hidden on a scratch card until unblocked; that row of banana symbols remains a row of banana symbols prior to, and after, being unblocked.

Accordingly, the static features of conventional scratch games do not provide a level of excitement that encourages game play. As a result, participation in conventional scratch games is somewhat limited.

SUMMARY

A system has a pre-recorded content database. Further, the system has a processor that establishes a virtual scratch card game. The processor also randomly determines a plurality of positions in a virtual scratch card grid that correspond to a winning outcome of the virtual scratch card game. Further, the processor searches for a plurality of pre-recorded video clips in the pre-recorded content database such that each of the plurality of pre-recorded video clips displays an event corresponding to the winning outcome. Additionally, the processor provides the plurality of pre-recorded video clips to a display device that renders the virtual scratch card grid according to a plurality of scratch-off blocks that, when activated, reveal each of the plurality of pre-recorded video clips at each of the corresponding plurality of positions.

Alternatively, a computer program may have a computer readable storage device with a computer readable program stored thereon that implements the functionality of the aforementioned system. As yet another alternative, a process that utilizes a processor may implement the functionality of the aforementioned system.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 2I illustrates the game parameter events of the simultaneous playback being displayed.

FIG. 6A illustrates an example of an alternative GUI that may be utilized at the initiation of an alternative virtual scratch card game.

DETAILED DESCRIPTION

A dynamic virtual scratch card gaming system is provided. Rather than displaying static game parameters, which may be blocked and then unblocked, the dynamic virtual scratch card gaming system displays one or more pre-recorded, or pre-captured, videos. After game play is initiated by a player, playback of the one or more pre-recorded videos is also initiated to determine a game parameter. For example, in contrast with receiving wagers on live or future sporting events, the pre-recorded videos may be based on Virtual Sports ("VS") games, which allow players to place wagers on a fictitious sequence of actual sporting events.

Moreover, rather than applying routine, conventional technology to provide a scratch-based game with static-based features, the dynamic virtual scratch card gaming system provides dynamic features implemented through a technology-based approach. For instance, the dynamic virtual scratch card gaming system implements a plurality of rules to determine a game outcome based on playback of the one or more pre-recorded videos. A particular portion of the virtual scratch card is then associated with a particular VS game-based outcome, as displayed in the one or more pre-recorded videos. Accordingly, the dynamic virtual scratch card gaming system generates a non-abstract result via a rules-based configuration for a virtual gaming system.

Figure 1:
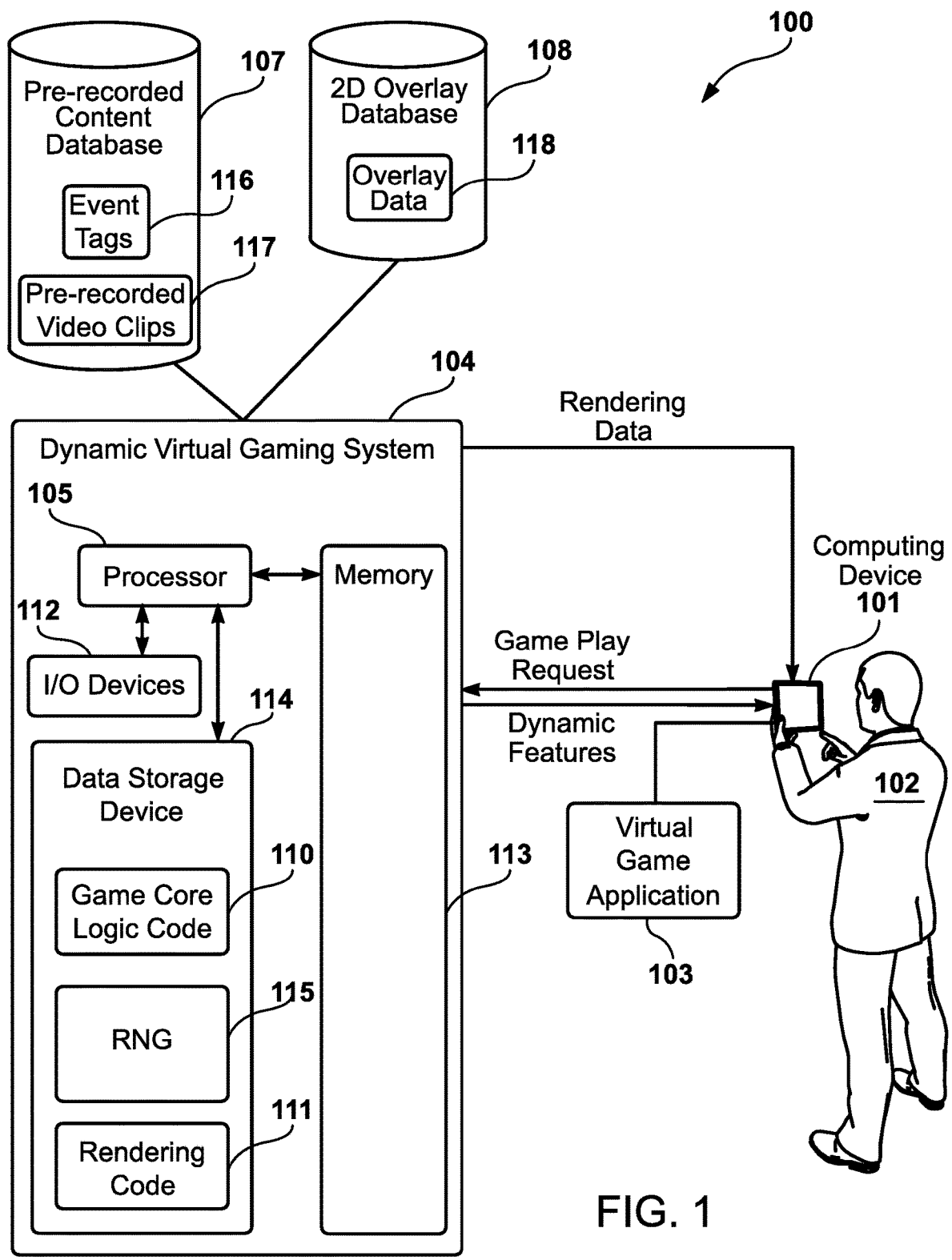
FIG. 1 illustrates a dynamic virtual scratch card game configuration that operates a virtual scratch card game.

FIG. 1 illustrates a dynamic virtual scratch card game configuration 100 that operates a virtual scratch card game. A user 102 may play, and place a wager for, a virtual scratch card game from a computing device 101 (e.g., smartphone, tablet device, laptop, personal computer, smartwatch, smart wearable device, virtual reality headset, augmented reality device, etc.). For instance, the computing device 101 may have stored thereon, or may access via a remotely located server, a virtual game application 103 that allows the user 102 to play the virtual scratch card game.

In one embodiment, the computing device 101 receives inputs from the user 102 (e.g., via touch screen inputs, button activations, hand gestures, etc.) and displays content associated with operation of the virtual scratch card game (e.g., via an integrated display screen). In another embodiment, the computing device 101 receives inputs from the user 102, but the content associated with operation of the virtual scratch card game is displayed by, or projected onto, a display screen that is distinct from the computing device 101. (The projection referred to herein is not limited to operation on a flat screen, or two-dimensional projection, as three-dimensional projection (e.g., via holographic projector) may be alternatively utilized to project the associated content.)

The dynamic virtual scratch card game configuration 100 also includes a dynamic virtual gaming system 104 that communicates with the virtual game application 103 on the computing device 101 via a network 105. In one embodiment, the dynamic virtual gaming system 104 determines the game parameters for the virtual scratch card game that is rendered by the computing device 101. For example, the dynamic virtual gaming system 104 may have a processor 106 that utilizes an RNG 115 to randomly select a plurality of pre-recorded, actual VS video segments. Further, the processor 106 may utilize the RNG 115 to randomly select positions on the virtual scratch card game grid.

Further, the dynamic virtual gaming system 104 may be in operable communication with a pre-recorded content database 107, which may store pre-recorded video clips 117 of skill-based events occurring prior to initiation of the virtual scratch card game, and a 2D overlay database 108, which may store various overlay data 118 that may be appended to the pre-recorded video clips. After the processor 106 determines an outcome of the virtual game, via execution of game core logic code 110 (e.g., according to the RNG 115), the processor 106 may determine from the game core logic code 110 that rendering code 111 is to be executed to compose rendering data for playback of the selected video clips 117 and corresponding 2D overlay data 118. The processor 106 may send the rendering data through the network 105 (computerized, telecommunications, wired, etc.) to the computing device 101 for display at the computing device 101.

Included as componentry within the dynamic virtual gaming system 104 are the processor 106, various input/output ("I/O") devices 112, a memory device 113, and a data storage device 114.

The processor 106 executes various code within the memory device 113. For instance, the processor 106 retrieves the game core logic code 110 and the rendering code 111 from the data storage device 114 for operation in the memory device 113.

In particular, the game core logic code 110 allows the processor 106 to operate the virtual scratch card game. For example, the game core logic code 110 may have a rules-based approach that randomly selects content associated with the virtual game for display during the virtual game. Accordingly, the game core logic code 110 may require that random data be obtained from a certified random source (e.g., a particular RNG 115).

Although the dynamic virtual gaming system 104 is depicted as being distinct from the computing device 101, the dynamic virtual gaming system 104, or componentry thereof, may be integrated within the computing device 101 in an alternative configuration.

FIGS. 2A-2I illustrate examples of a GUI 200 displayed by the computing device 101 illustrated in FIG. 1. The GUI 200 allows a player of the virtual scratch card game to interact with the virtual scratch card game in order to play the virtual scratch card game.

Figure 2A:
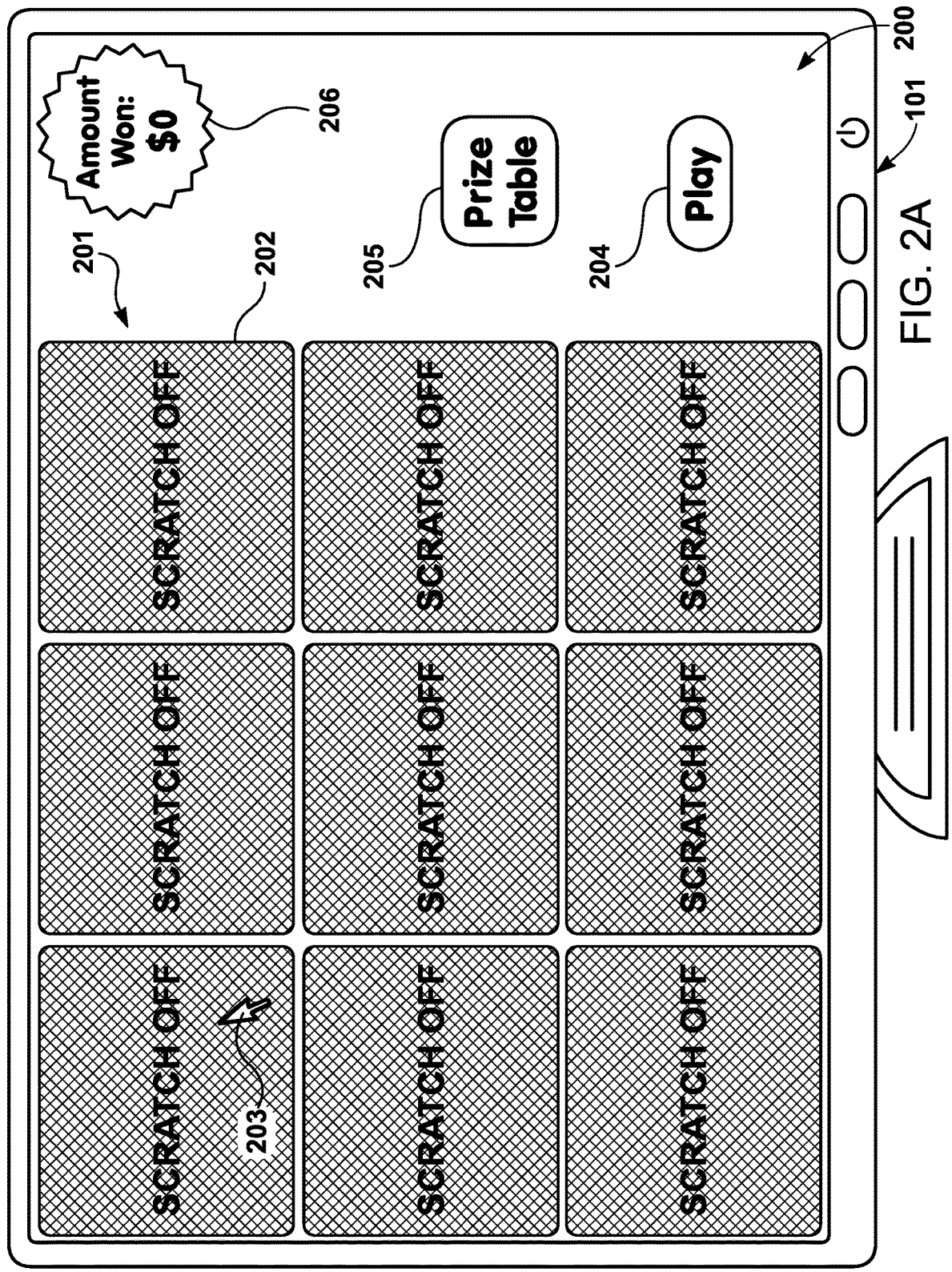
FIG. 2A illustrates an example of a graphical user interface ("GUI") at the initiation of a virtual scratch card game.

FIG. 2A illustrates an example of the GUI 200 at the initiation of a virtual scratch card game. For instance, the GUI 200 may display a virtual scratch card grid 201 that has a plurality of scratch-off blocks 202. The user 102 may position a pointing indicium 203 (e.g., mouse pointer) over a scratch-off block 202 of interest by activating (e.g., clicking) the pointing indicium 203 over the scratch-off block 202 of interest.

Further, the GUI 200 may have various, additional interactive features. For instance, the GUI 200 may have a "play" button 204 over which the user 102 may position the pointing indicium 203 to initiate play of the virtual scratch card game. In addition, the GUI 200 may have a "prize table" button 205 over which the user 102 may position the pointing indicium 203 to display a prize structure for the virtual scratch card game.

Moreover, the GUI 200 may display various non-interactive features such as an "amount won" feature 206 that displays the amount won according to the prize table. Additional non-interactive features including, but not limited to, amount wagered may also be displayed.

Figure 3:
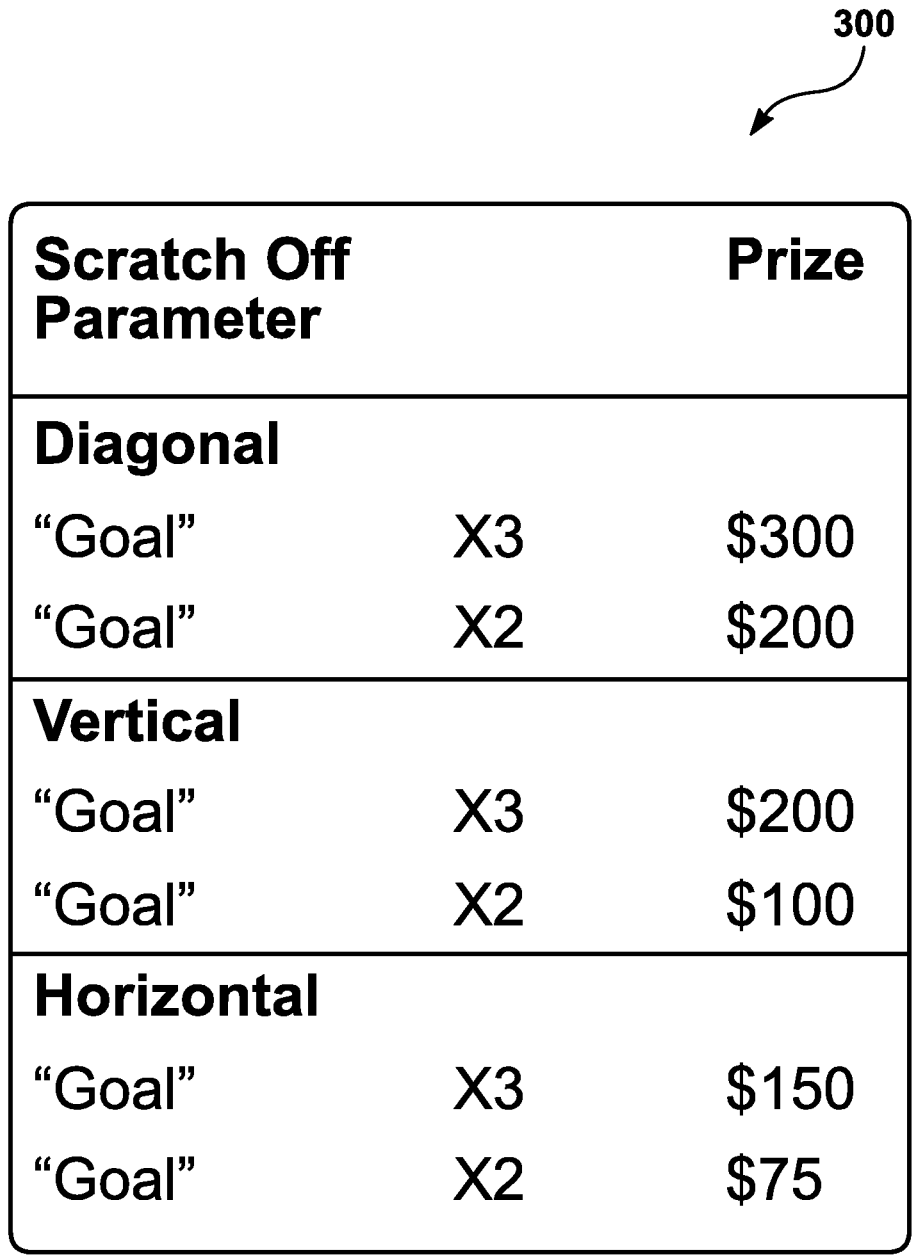
FIG. 3 illustrates that activation of the prize table button in FIG. 2A results in the display of a window that displays a prize table.

Turning to FIG. 3, activation of the prize table button 205 in FIG. 2A results in the display of a window that displays a prize table 300. For example, the window may be a pop-up window displayed within the GUI 200, or may be a different window that is rendered for display independently of the GUI 200.

As an example, the prize table 300 may indicate various prizes, which may be won for certain events that occur within the pre-recorded video clips are displayed after activation (i.e., virtual scratching) of the scratch-off blocks 202. For instance, the event of "goal" appearing within a certain number of consecutive scratch-off blocks 202 and various orientations (e.g., diagonal, vertical, horizontal) may lead to various prizes. In other words, the prize table 300 may be based not only on the quantity of game parameters occurring as events during playback of the pre-recorded video clips, but also the position of the corresponding scratch-off blocks 202 within the virtual scratch card grid 201. Alternatively, bonus prizes may be based on the location of winning game parameters within the virtual scratch card grid 201. In other words, the prize may be based on quantity, but the bonus prize may be based on the location.

Figure 2B:
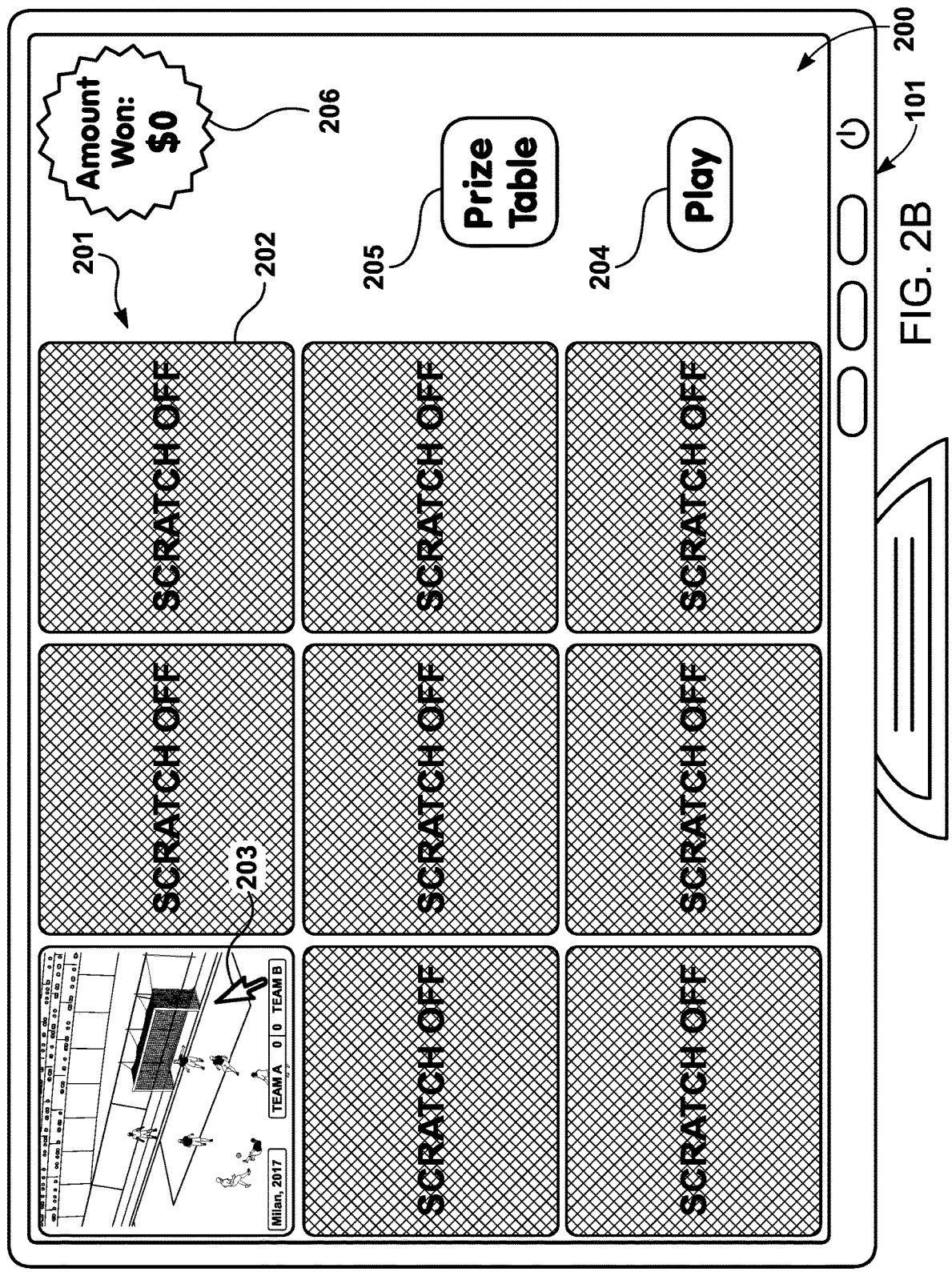
FIG. 2B illustrates a pointing indicium being positioned over a first scratch-off block and activating the scratch-off block.

Turning to FIG. 2B, the user 102 has positioned the pointing indicium 203 over a first scratch-off block 202 and activated (i.e., clicked) the scratch-off block 202. As a result, playback of a randomly selected VS-based video clip 117 is initiated. For example, the illustrated video clip is a portion of a previously recorded soccer game, obtained from the pre-recorded content database 107, in which each team has already scored one goal. At the outset of the video clip, the player from one of the teams is depicted as approaching the ball to kick the ball into the goal. The video clip progresses at least until the game parameter (e.g., goal or miss) is obtained.

Figure 2C:
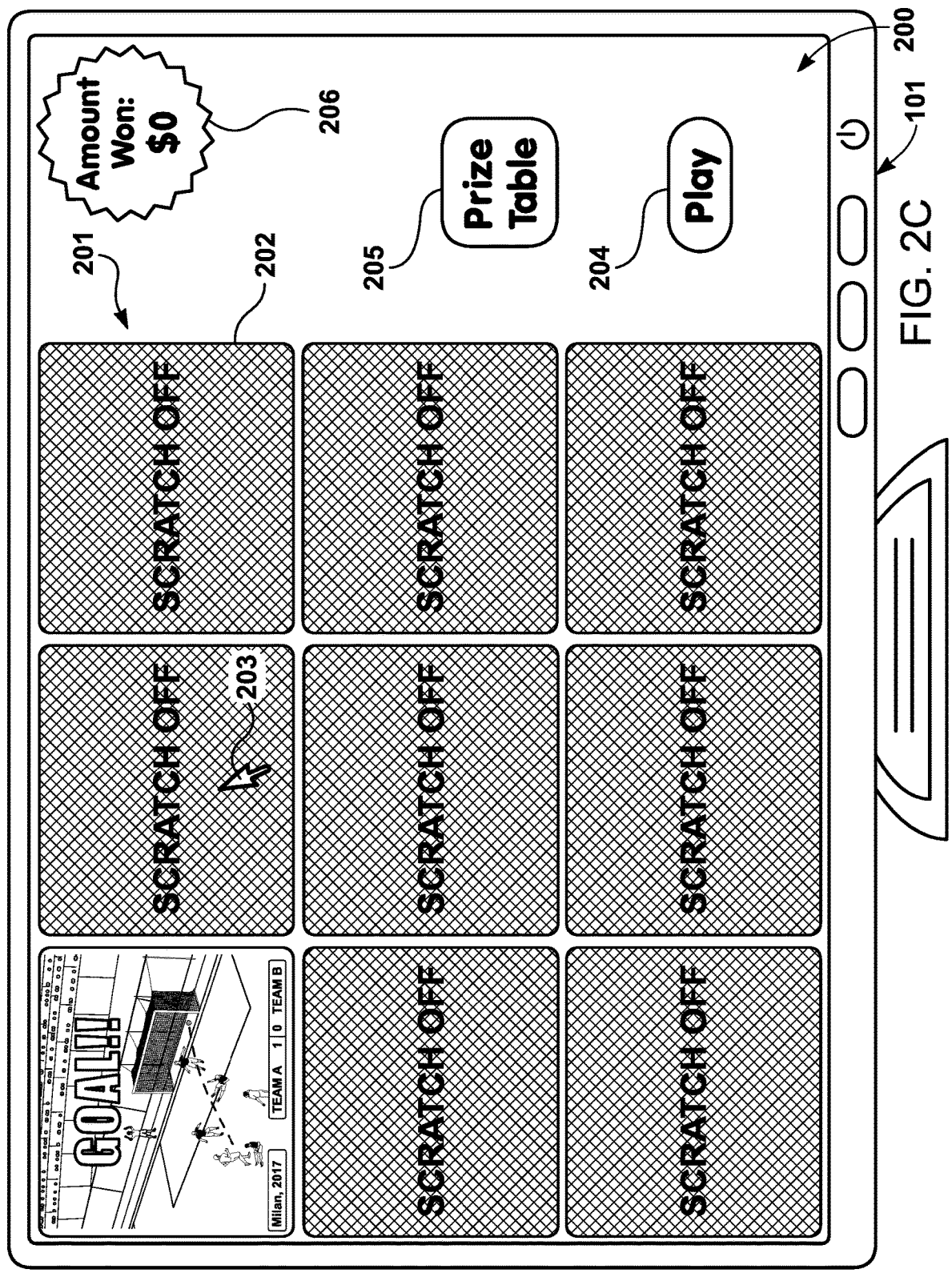
FIG. 2C illustrates the game parameter of a "goal" being displayed.

FIG. 2C illustrates the game parameter of a "goal" being displayed. The imagery and text (e.g., "goal") may be obtained as overlay data 118 from the 2D overlay database 108 for display in conjunction with the pre-recorded video clip 117. Accordingly, indicia corresponding to the plurality of game parameters may be obtained from the 2D overlay database 108.

Subsequently, the user 102 may select additional scratch-off blocks 202 until all of the remaining scratch-off blocks 202 are revealed, or until a time limit has been reached. In one embodiment, the end of the video clip is displayed without further playback so that the user is able to determine the game parameter (e.g., goal or miss) per scratch-off block. In another embodiment, playback of each of revealed scratch-off blocks 202 is reiterated through so that the user 102 may continue to view the action in various scratch-off blocks 202. In yet another embodiment, after the action has completed, the game parameter associated with a particular scratch-off block 202 is displayed in a text format (e.g., a display of "goal" without the corresponding pre-recorded video clip) so that the user 102 may identify the game parameters associated with each of the various scratch-off blocks 202.

Figure 2D:
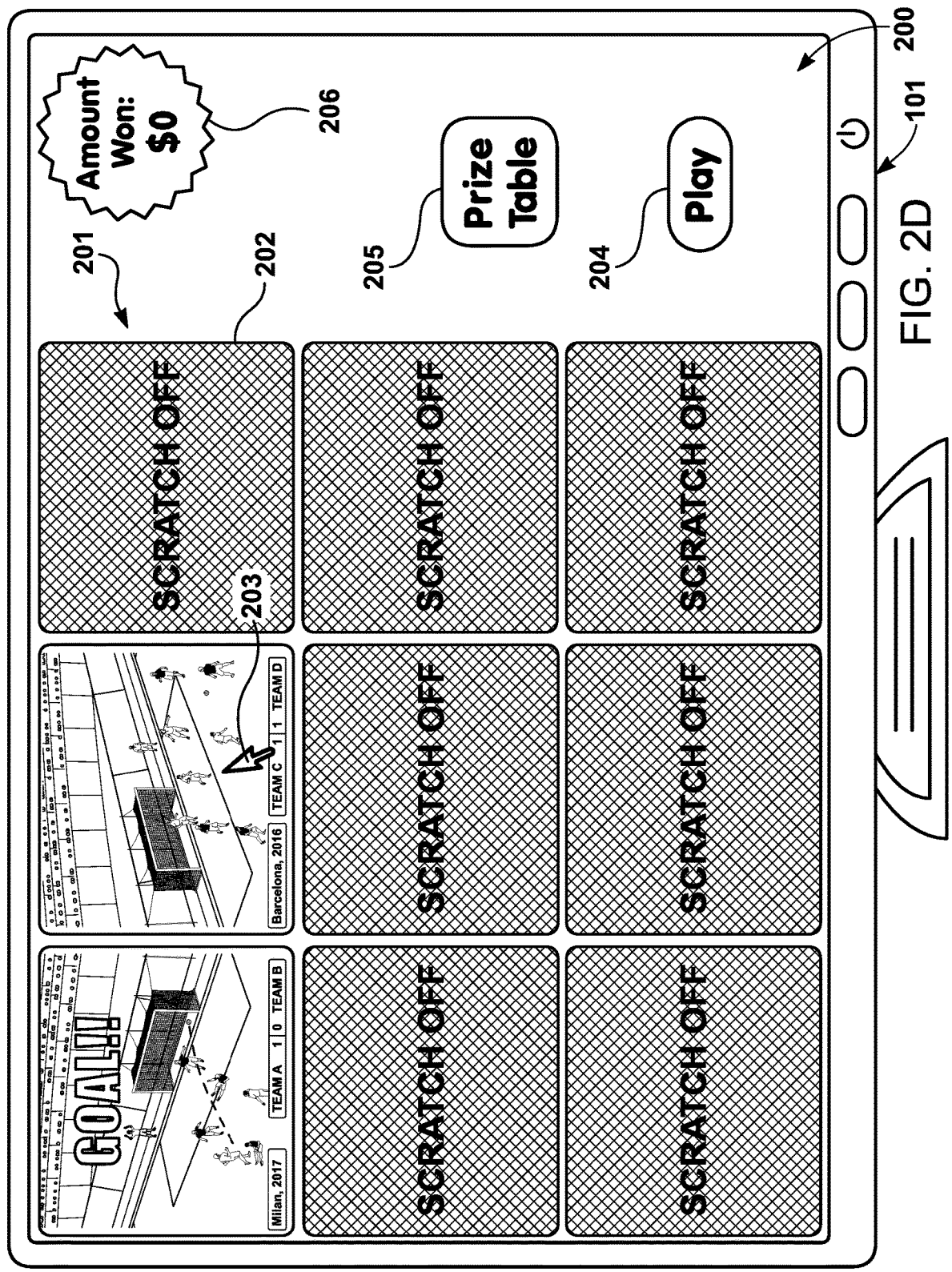
FIG. 2D illustrates the user activating the pointing indicium over a second scratch-off block.

To further illustrate the display of the VS-based game events, FIG. 2D illustrates the user 102 activating (e.g., clicking) the pointing indicium 203 over a second scratch-off block 202. Although the user 102 may activate the scratch-off blocks 202 in a sequence (e.g., left to right), the user 102 may, instead, randomly activate scratch-off blocks 202 (e.g., the corners first, the middle, etc.). As an alternative, a quick-pick button may be provided to allow a user to have the computing device 101, or the dynamic virtual gaming system 104, select the scratch-off blocks 202 for the user 102.

Figure 2E:
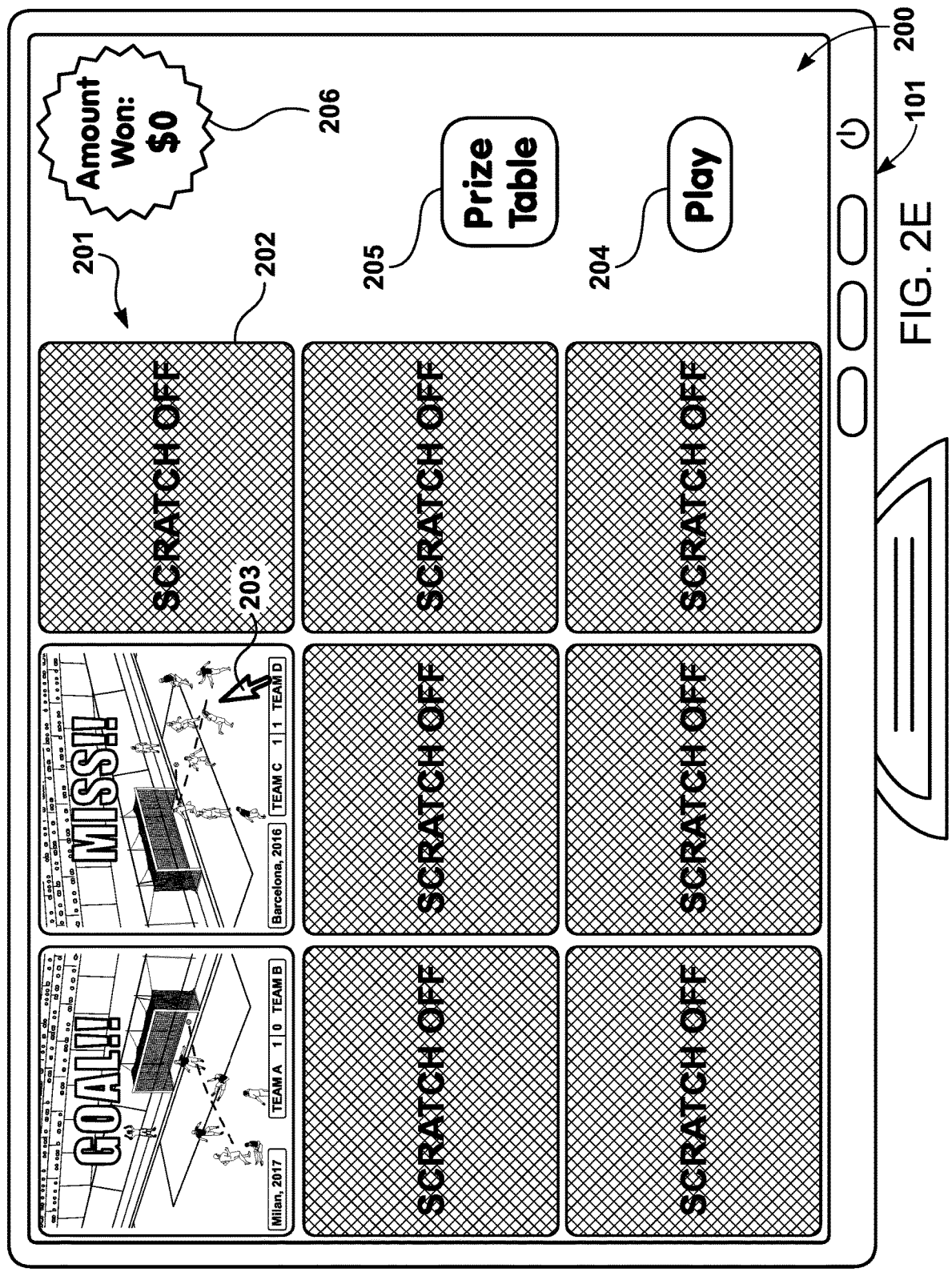
FIG. 2E illustrates the event encapsulated by the video clip corresponding to the second scratch-off block illustrated in FIG. 2D being a miss.
Figure 2F:
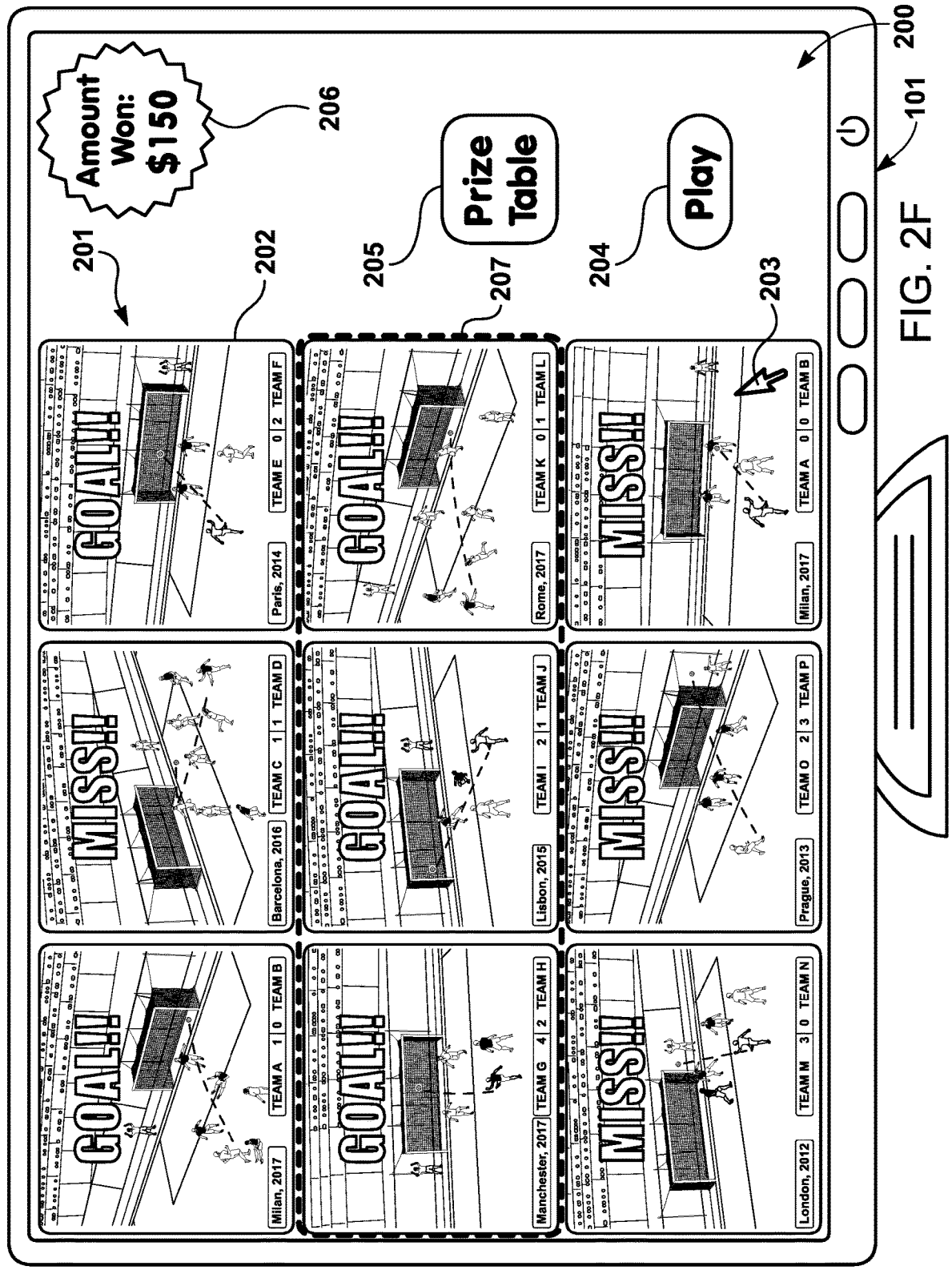
FIG. 2F illustrates the virtual scratch grid being displayed after all of the scratch-off blocks have been revealed.

Further, FIG. 2E illustrates the event encapsulated by the video clip corresponding to the second scratch-off block illustrated in FIG. 2D being a miss. Finally, FIG. 2F illustrates the virtual scratch grid 201 being displayed after all of the scratch-off blocks have been revealed. In the illustrated example, the game parameter events corresponding to the pre-recorded video clips resulted in a winning row of scratch-off blocks 207 indicating goals. Based on the prize table 300 illustrated in FIG. 3, the user 102 would win an amount of one hundred fifty dollars.

Figure 2G:
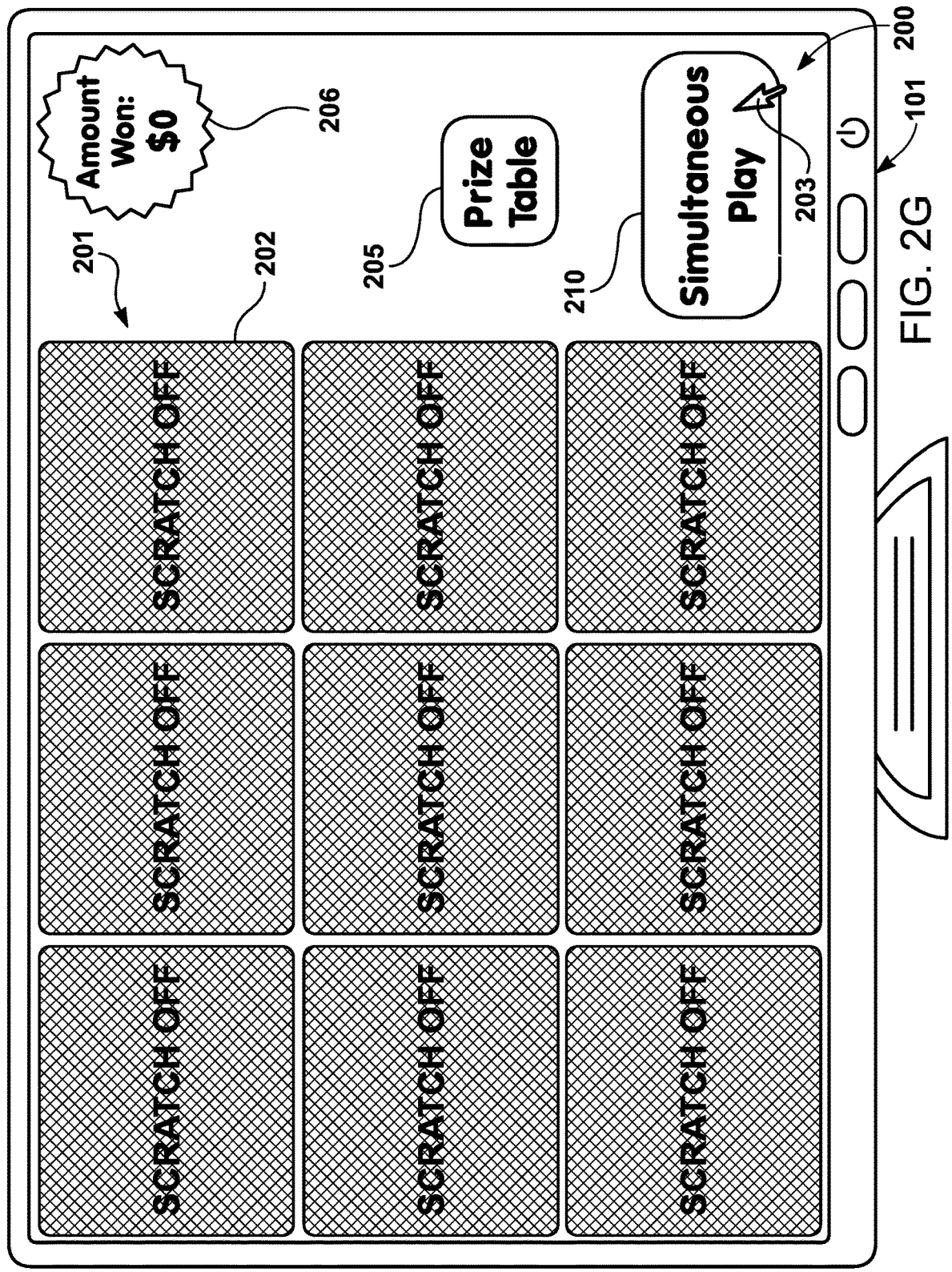
FIG. 2G illustrates the pointing indicium being positioned over a simultaneous play button to initiate simultaneous playback of all of the pre-recorded video clips corresponding to the scratch-off blocks.

In yet another embodiment, the user 102 does not have to select one scratch-off box at a time with the pointing indicium 203. For example, as illustrated in FIG. 2G, the user 102 may position the pointing indicium 203 over a simultaneous play button 210 to initiate simultaneous playback of all of the pre-recorded video clips corresponding to the scratch-off blocks 202. In one embodiment, some of the pre-recorded video clips may have a corresponding first duration, whereas others of the pre-recorded video clips may have a corresponding second duration. For example, some of the scratch-off blocks 202 may correspond to pre-recorded videos having a ten second duration, whereas others of the scratch-off blocks 202 may correspond to pre-recorded videos having a three second duration. Therefore, over the ten second play duration, each scratch-off block 202 will reveal a game parameter associated with the prize table 300 illustrated in FIG. 3. Alternatively, a play all button may allow for the pre-recorded video clips to be played in a sequence, rather than all being played concurrently.

Figure 2H:
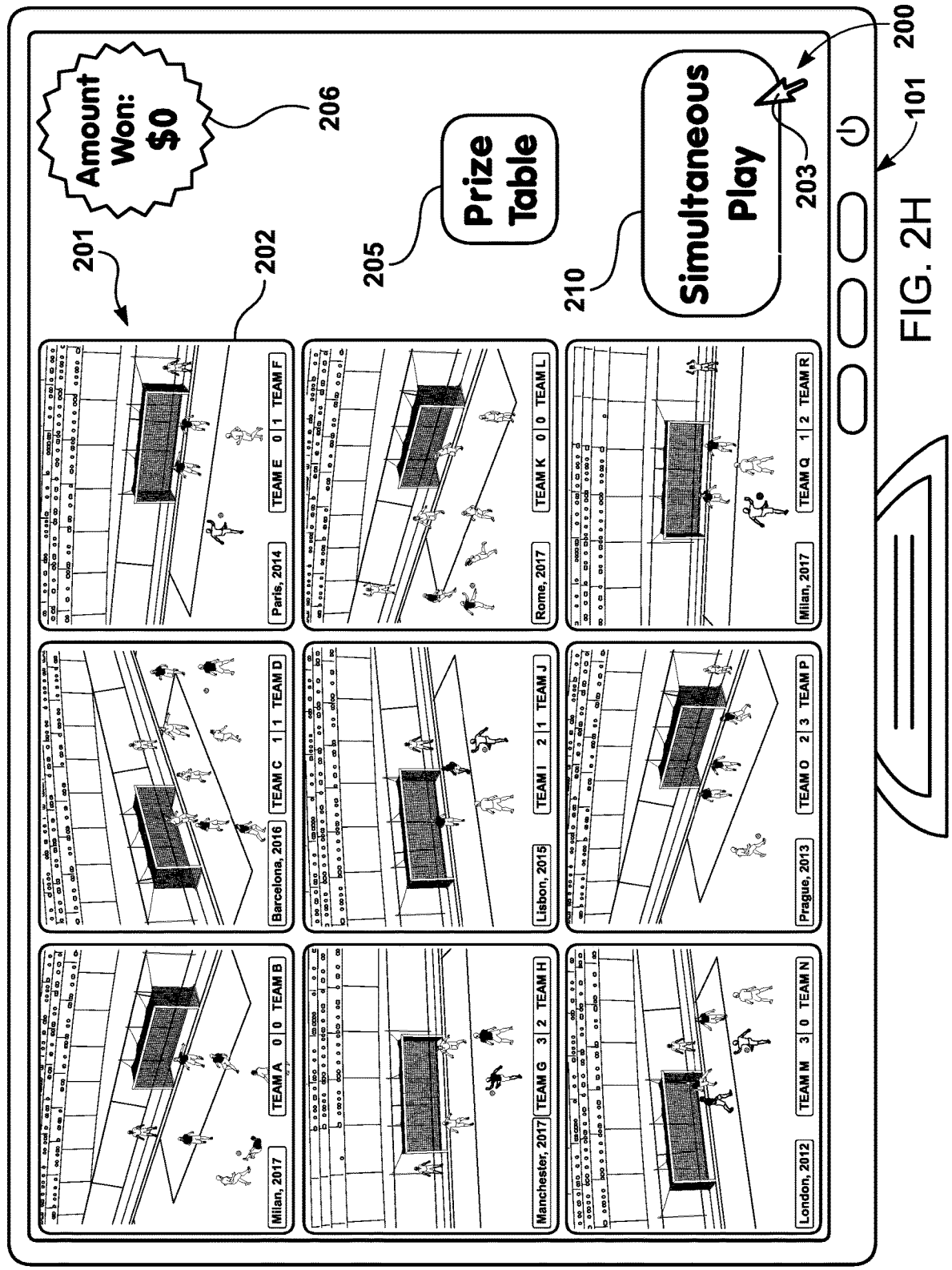
FIG. 2H illustrates the outset of simultaneous playback of the pre-recorded video clips.
Figure 21:
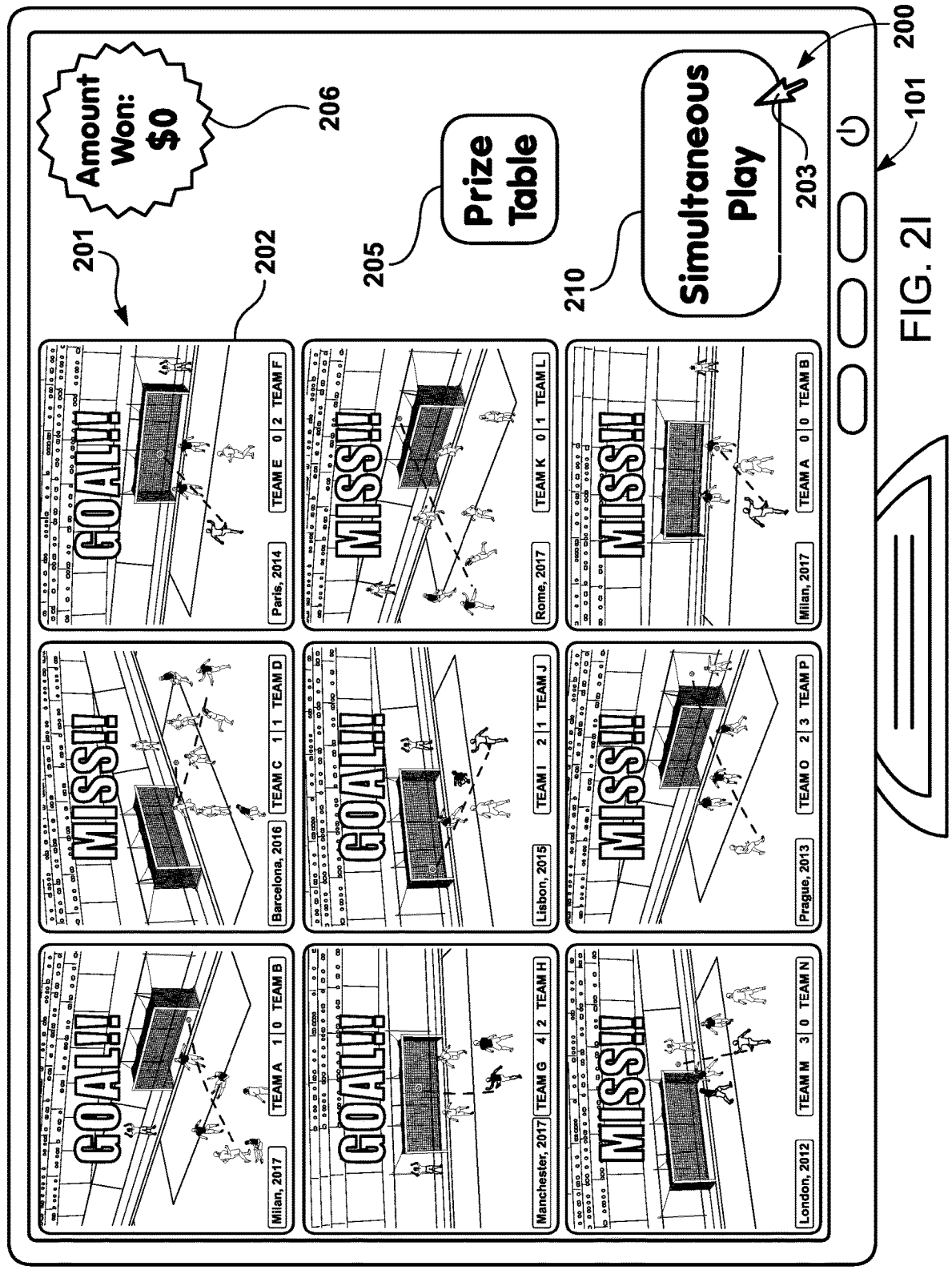

FIG. 2H illustrates the outset of simultaneous playback of the pre-recorded video clips. Further, FIG. 2I illustrates the game parameter events of the simultaneous playback being displayed.

Accordingly, the virtual scratch card grid 201 illustrated in FIGS. 2A-2I allows dynamic features (e.g., playback of pre-recorded VS-based game events) to be provided during an online scratch-off game; such dynamic features provide additional levels of excitement for the user 102.

To obtain an intended outcome determined by the RNG 115 illustrated in FIG. 1 (e.g., a particular horizontal row of scratch-off blocks 202 resulting in a winning outcome), the dynamic virtual gaming system 104 determines the pre-recorded videos with corresponding events. For example, the dynamic virtual gaming system 104 searches through the pre-recorded content database 107 not just for pre-recorded video clips for random VS-based games, but rather for pre-recorded video clips that have events corresponding to the particular game parameter associated with the intended outcome determined by the RNG 115 (e.g., video clips with goals rather than with misses or no goal attempts at all).

In one embodiment, the dynamic virtual gaming system 104 illustrated in FIG. 1 searches through the pre-recorded content database 107 according to one or more event tags 116 to find a plurality of pre-recorded videos that correspond to the intended outcome determined by the RNG 115 (e.g., a horizontal row of videos with goals). The one or more event tags 116 describe events (e.g., goals, misses, no goal attempts) that occur during the one or more video clips stored in the pre-recorded content database 107. Accordingly, rather than having to have to analyze each video clip for particular events, the dynamic virtual gaming system 104 is able to perform an optimized search for events according to the event tags to quickly find video clips with events corresponding to the virtual scratch card grid 201 (FIG. 2). Therefore, the dynamic virtual gaming system 104 improves the functioning of a computer by improving the search time for dynamic features to be positioned within the virtual scratch card grid 201.

Moreover, the dynamic virtual gaming system 104 improves the functioning of a computer by improving processing speed via the processor 106. Instead of expending computing resources on analyzing each video clip for compliance with game parameters that match the intended outcome to be displayed in the virtual scratch card grid 201, the processor 106 may perform a database command to perform a filtered search only through video clips with the corresponding events. Memory requirements are also reduced because the processor 106 only analyzes video clips corresponding to the event tags that match the intended outcome for display in the virtual scratch card grid 201.

Thus, the dynamic virtual gaming system 104 may randomly determine an outcome of a virtual scratch card game that includes events, search a database for pre-recorded video clips encompassing those events according to event tags, and display the pre-recorded video clips to the user 102 upon activation of scratch-off blocks 202.

Figure 4A:
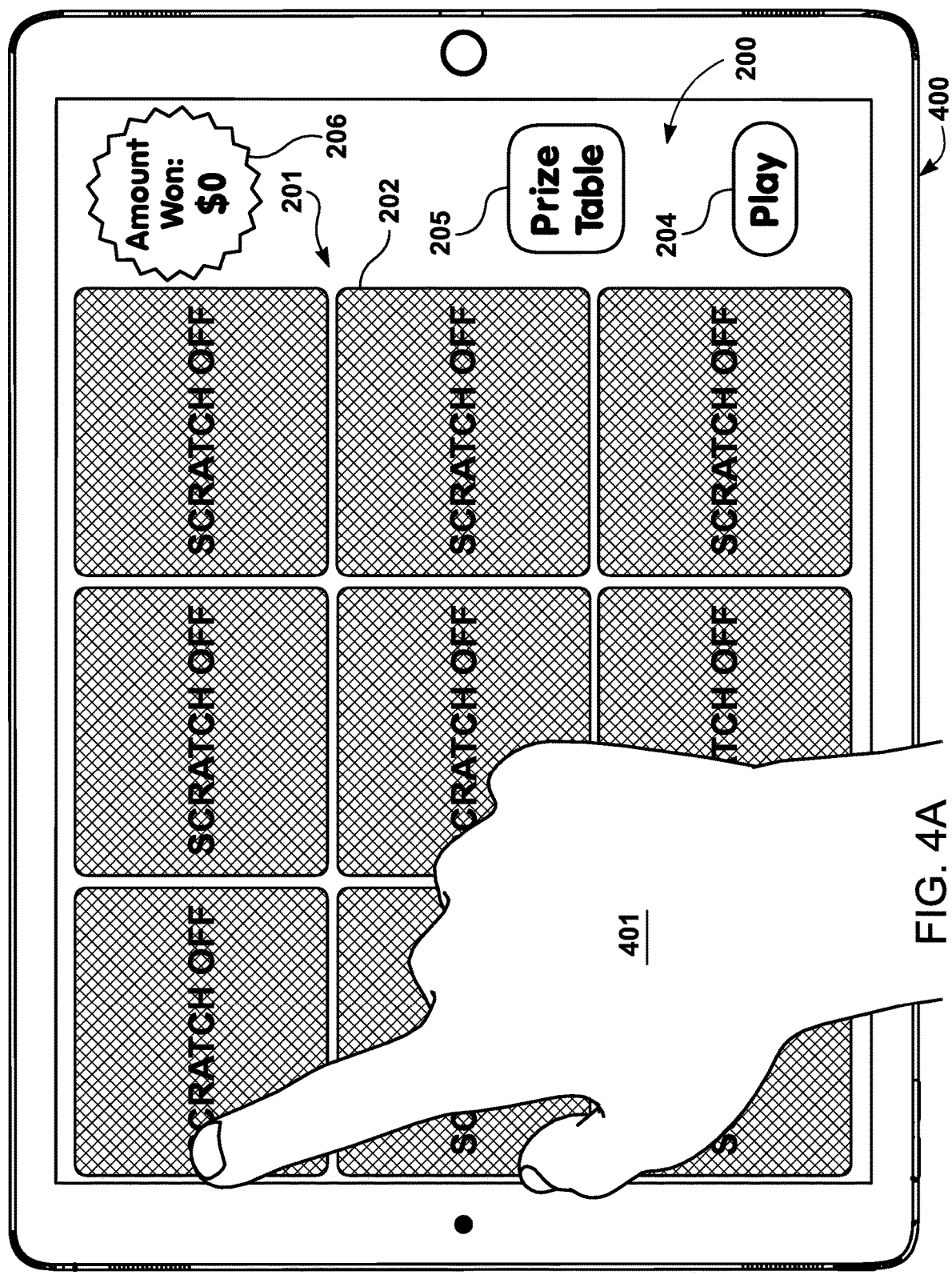
FIG. 4A illustrates the virtual scratch card grid with the unrevealed scratch-off blocks being displayed on a tablet device.
Figure 4B:
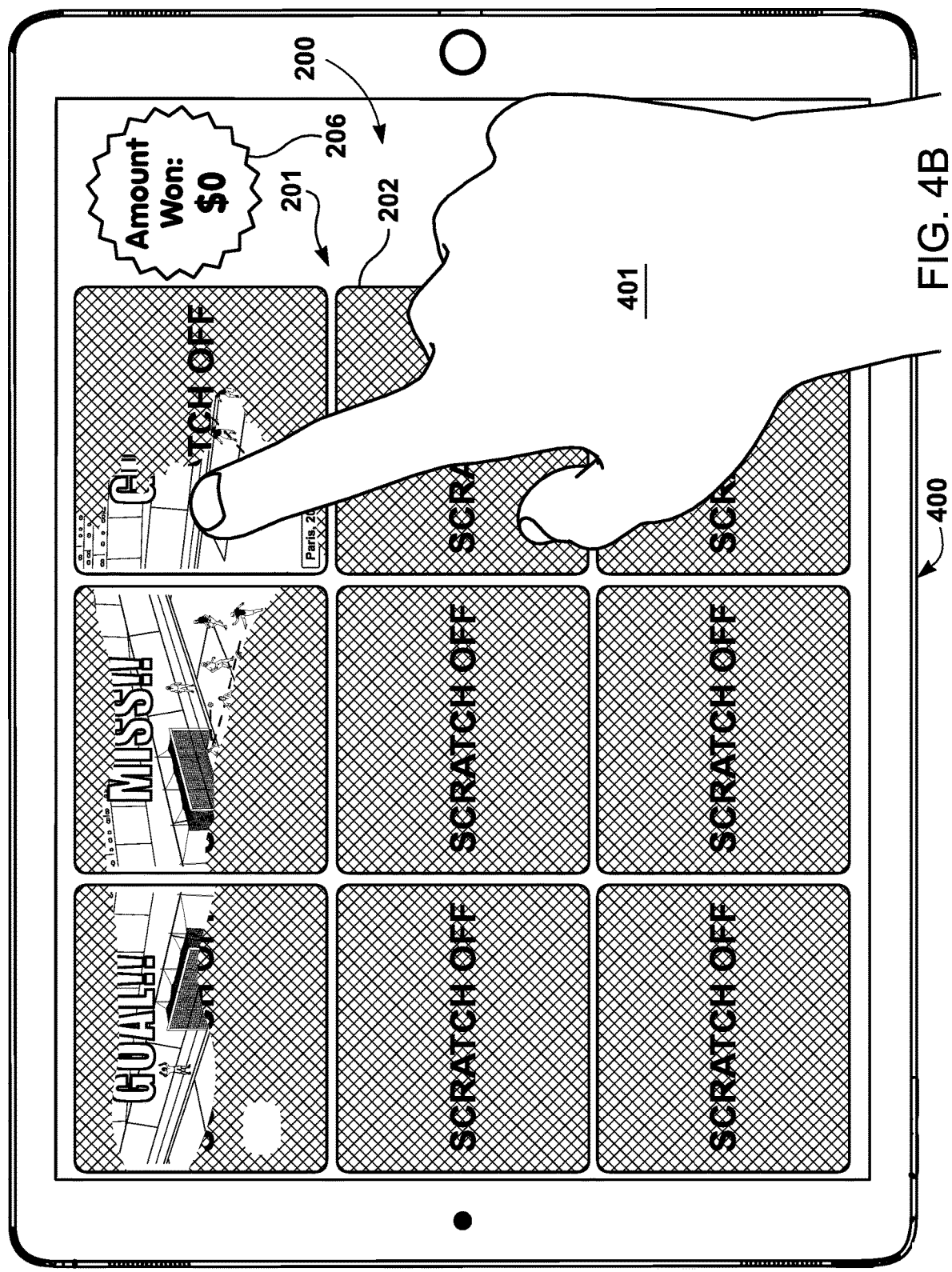
FIG. 4B illustrates the user swiping the finger to perform a partial revealing of some of the scratch-off blocks.
Figure 4C:
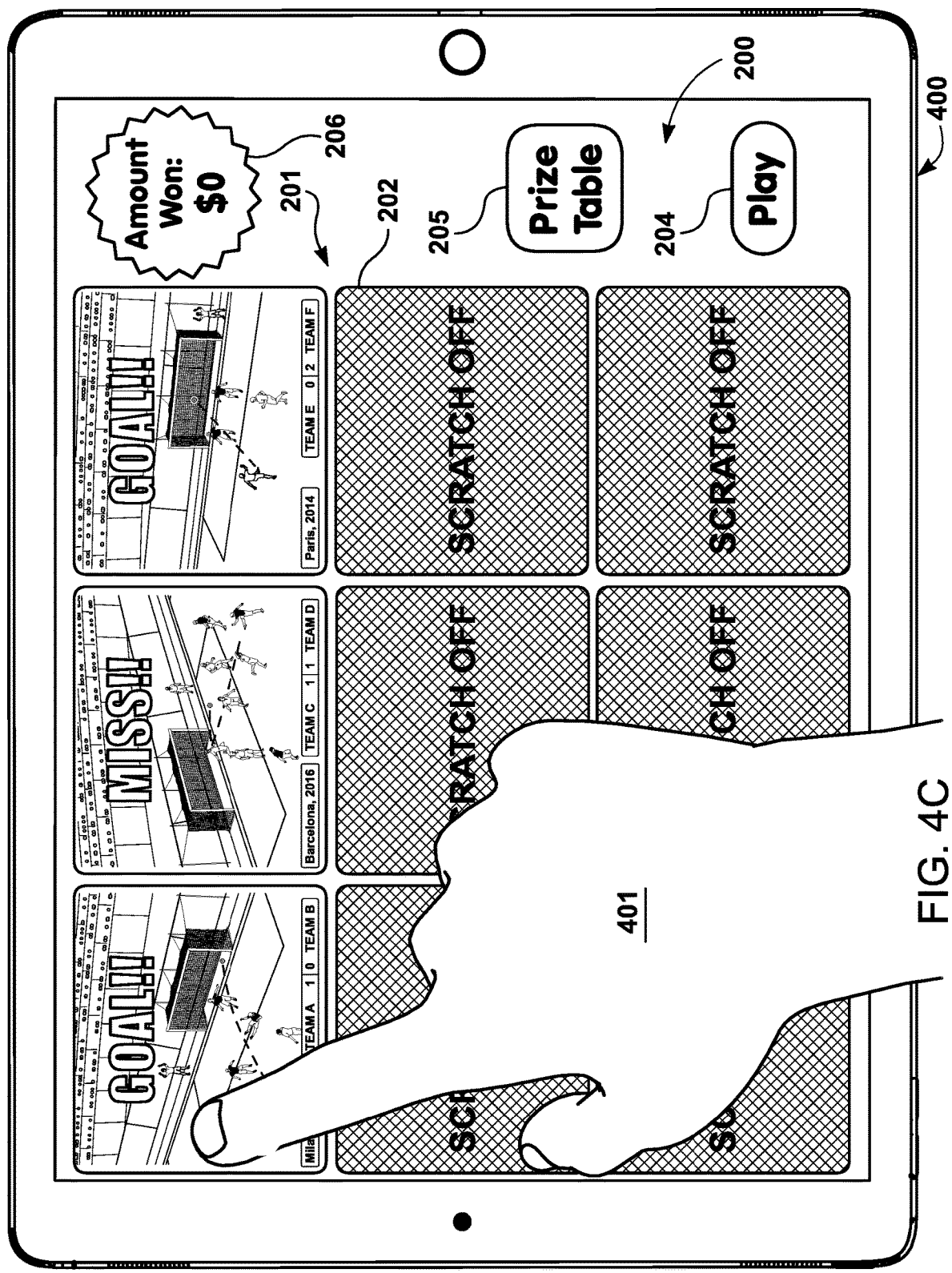
FIG. 4C illustrates the scratch-off blocks being fully revealed after the user has fully swiped the scratch-off blocks.

FIGS. 4A-C illustrate the virtual scratch card grid 201 of FIGS. 2A-2I being rendered on a touch-screen computing device 400. For example, FIG. 4A illustrates the virtual scratch card grid 201 with the unrevealed scratch-off blocks 202 being displayed on a tablet device. The user 102 may swipe a finger 401 on the display screen of the tablet device to activate the plurality of scratch-off blocks 202.

FIG. 4B illustrates the user 102 swiping the finger 401 to perform a partial revealing of some of the scratch-off blocks 202. In one embodiment, even a partial revealing initiates playback of a pre-recorded video clip corresponding to a scratch-off block. For example, by the user 102 swiping the finger 401 over a scratch-off block 202 to reveal as little as approximately ten percent of the scratch-off block 202, playback of the pre-recorded video clip may be initiated. By initiating playback of a portion of the pre-recorded video clip, the dynamic virtual scratch card game configuration 100 adds another level of excitement in that the user 102 may have to hurry to scratch off the remainder of the scratch-off block 202 to view the action encompassed by the pre-recorded video clip.

In one embodiment, the dynamic virtual scratch card game configuration 100 may establish a predetermined scratch-off threshold for initiating playback of a pre-recorded video clip corresponding to a scratch-off block 202. For example, the dynamic virtual scratch card game configuration 100 may determine that playback should not be initiated unless twenty percent of the scratch-off block 202 has been scratched-off (i.e., swiped) via the touch screen. Accordingly, the dynamic virtual scratch card game configuration 100 may encourage the user 102 to quickly swipe the scratch-off block 202 to avoid missing out on the associated action, but also provide the user 102 with a significant portion of the video clip to view prior to completion of the video clip if the user 102 does not fully swipe the scratch-off block prior to completion of the video clip. Finally, FIG. 4C illustrates the scratch-off blocks 202 being fully revealed after the user 102 has fully swiped the scratch-off blocks 202.

Figure 5:
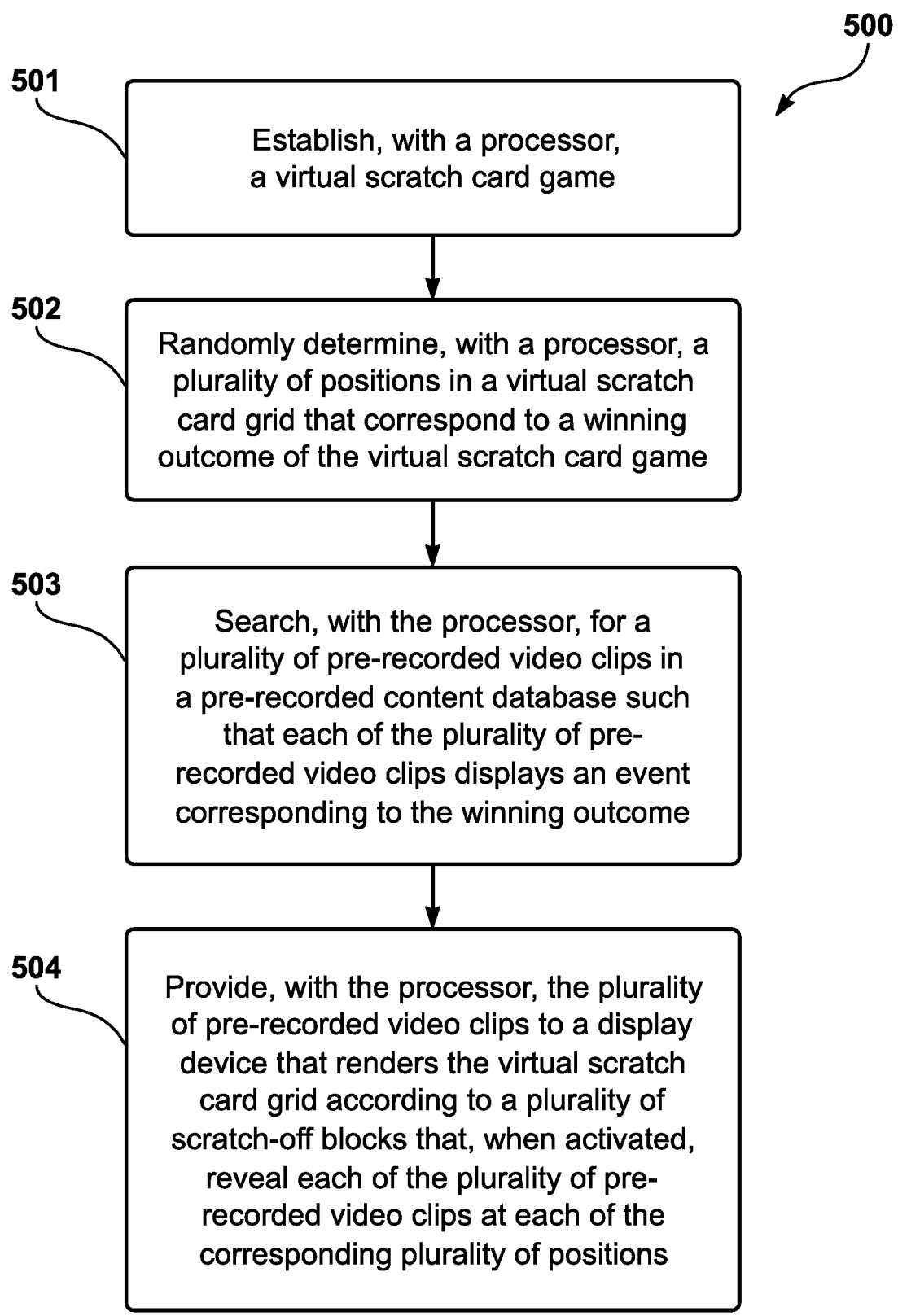
FIG. 5 illustrates a process that may be utilized by the dynamic virtual scratch card game configuration illustrated in FIG. 1 to generate dynamic features for a virtual scratch card game.

FIG. 5 illustrates a process 500 that may be utilized by the dynamic virtual scratch card game configuration 100 illustrated in FIG. 1 to generate dynamic features for a virtual scratch card game. At a process block 501, the process 500 establishes, with the processor 106, a virtual scratch card game. Further, at a process block 502, the process 500 randomly determines, with the processor 106, a plurality of positions in a virtual scratch card grid that correspond to a winning outcome of the virtual scratch card game. In addition, at a process block 503, the process 500 searches, with the processor 106, for a plurality of pre-recorded video clips in a pre-recorded content database such that each of the plurality of pre-recorded video clips displays an event corresponding to the winning outcome. Finally, at a process block 504, the process 500 provides, with the processor 106, the plurality of pre-recorded video clips to a display device that renders the virtual scratch card grid according to a plurality of scratch-off blocks that, when activated, reveal each of the plurality of pre-recorded video clips at each of the corresponding plurality of positions.

The virtual scratch grid 201 illustrated in FIGS. 2A-2I and 4A-4C is composed such that each scratch-off block 202 may correspond to a pre-recorded video clip. In other words, activation of a scratch-off block 202 (e.g., via a click, touch-screen input, etc.) transformed at least a portion of the scratch-off block 202 into a media playback window that played at least a portion of the video clip. In another embodiment, activation of a scratch-off block 202 may instantiate display of a media playback window that is located in a different position than the scratch-off block 202. For example, activation of a scratch-off block 202 may initiate playback of a video segment in a media playback window at a corner of the GUI 200 that is not encompassed by the virtual scratch card grid 201. As another example, activation of a scratch-off block 202 may initiate a temporary switch from the rendering of the GUI 200 on a display screen of the computing device 101 to a different rendering that only displays the pre-recorded video segment; the computing device 101 may then revert back to rendering the GUI 200 after playback of the pre-recorded video segment has completed.

FIG. 6A illustrates an example of an alternative GUI 600 that may be utilized at the initiation of an alternative virtual scratch card game. For example, the GUI 600, as rendered by the display screen of the computing device 101, may display a virtual scratch card 601 that has various scratch-off indicia 602 (e.g., soccer balls) that may or may not correspond to the type of VS game associated with the pre-recorded video clips. (A scratch off block 202, as illustrated in FIGS. 2A-2I and 4A-4C may be supplanted with an indicium that can be a variety of shapes, symbols, etc.). In addition, a prize table 603 is displayed by the computing device 101. For example, the prize table 603 illustrates various prizes that may be won for events occurring in pre-recorded video segments corresponding to each of the scratch-off indicia 602.

As an example, the user 102 (FIG. 1) may play the game according to one or more virtual game rules displayed in a virtual game rules window 604. For instance, the virtual game rules may specify that the user 102 may select only three out of six scratch-off indicia 602 for activation. The computing device 101 then displays the pre-recorded video clips corresponding only to those activated scratch-off indicia, not the other scratch-off indicia. In one embodiment, the processor 106 randomly determines the outcome of the virtual scratch-off game and selects only three pre-recorded video clips to match that outcome of the virtual scratch-off game. In another embodiment, the processor 106 (FIG. 1) randomly determines six possible game parameters (e.g., goal or miss) and associates each game parameter with one of the virtual scratch-off indicia 602. The user 102 then, at least partially determines, what prize, if any, is won based on the selection of three virtual scratch-off indicia 602. For example, four of the virtual scratch-off indicia 602 may be associated with a "goal" event in the corresponding pre-recorded video clips, whereas two of the virtual scratch-off indicia 602 may be associated with a "miss" event in the corresponding pre-recorded video clips. The user 102 may win a larger prize if the three selected virtual scratch-off indicia 602 all correspond to "goals," as opposed to some only corresponding to "goals."

The various quantities of virtual scratch-off indicia 602, prizes, etc. may vary from those illustrated and discussed, which are provided only as examples.

Figure 6B:
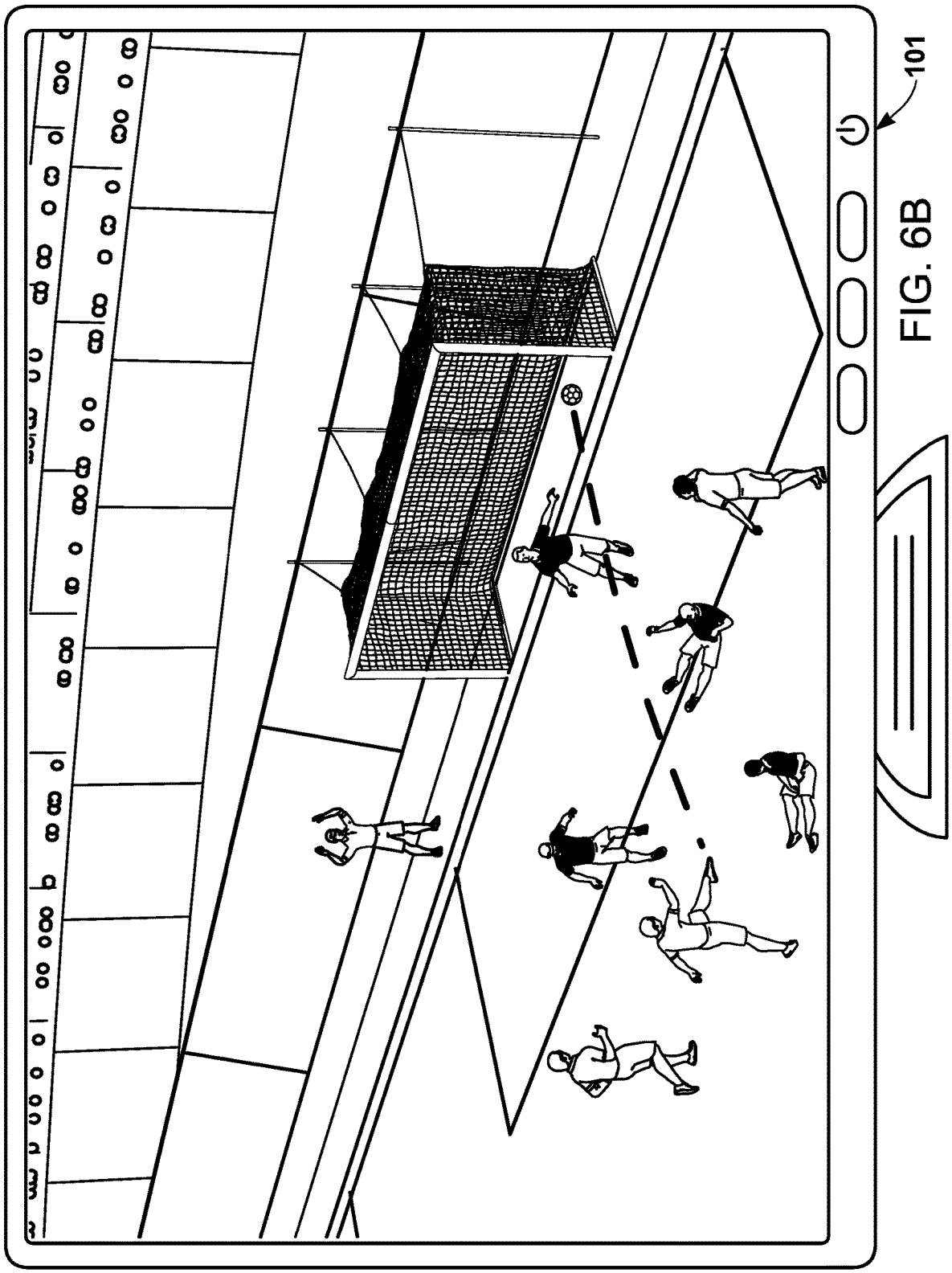
FIG. 6B illustrates an example of the computing device illustrated in FIG. 6A rendering a video clip corresponding to the virtual scratch-off indicia activated in FIG. 6A.

Further, FIG. 6B illustrates an example of the computing device 101 illustrated in FIG. 6A rendering a video clip corresponding the virtual scratch-off indicia 602 activated in FIG. 6A. As an example, the pre-recorded video clip may be a video segment that encompasses an event (e.g., "goal") corresponding to a game parameter illustrated in the prize table 603. In one embodiment, the computing device 101 displays an entirely different window/screen than the GUI 600 to display the pre-recorded video clip. In an alternative embodiment, the computing device 101 displays an overlay of the pre-recorded video over a portion of the GUI 600. As a result, the user 102 may still be able to view some features of the GUI 600 (e.g., the prize table 603) while viewing the pre-recorded video clips.

Figure 6C:
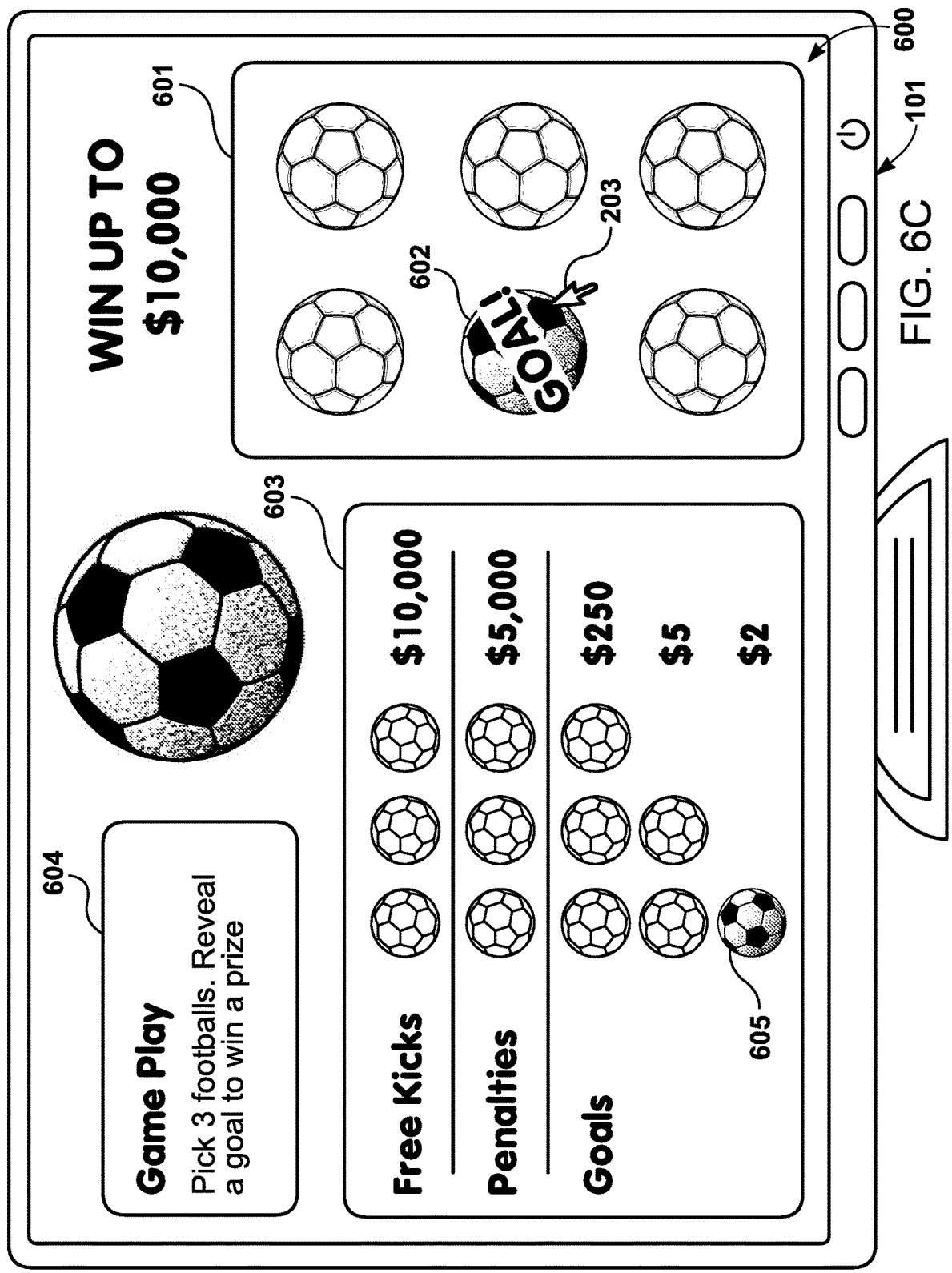
FIG. 6C illustrates an example of the computing device illustrated in FIG. 6B reverting back to the GUI illustrated in FIG. 6A.

Moreover, FIG. 6C illustrates an example of the computing device 101 illustrated in FIG. 6B reverting back to the GUI 600 illustrated in FIG. 6A. For instance, the selected virtual scratch-off indicium 602 may be augmented with a game parameter feature (e.g., text/imagery indicating "goal") based on an event displayed by the pre-recorded video clip illustrated in FIG. 6B. In other words, rather than displaying 2D overlay data (e.g., team names, game location, event outcome, etc.) over the pre-recorded video clip, the computing device 101 may instead display 2D overlay data over, or in proximity to, a scratch-off indicium 602. As yet another alternative embodiment, the computing device 101 may display the 2D overlay data in both instances—over a pre-recorded video clip and a scratch-off indicium 602.

Further, in another embodiment, the computing device 101 may augment a prize table indicium 605 illustrated in the prize table 603 upon an event occurring during playback of a pre-recorded video clip. For example, as a result of the event being a "goal" that occurs during the playback of the pre-recorded video clip in FIG. 6B, the computing device 101 may add imagery (e.g., shading, additional colors, etc.) to the prize table indicium 605 corresponding to one goal. As the virtual scratch-off game progresses, the computing device 101 may adjust (remove, add, and/or modify) augmented features to represent the current state of the virtual scratch-off game.

Figure 6D:
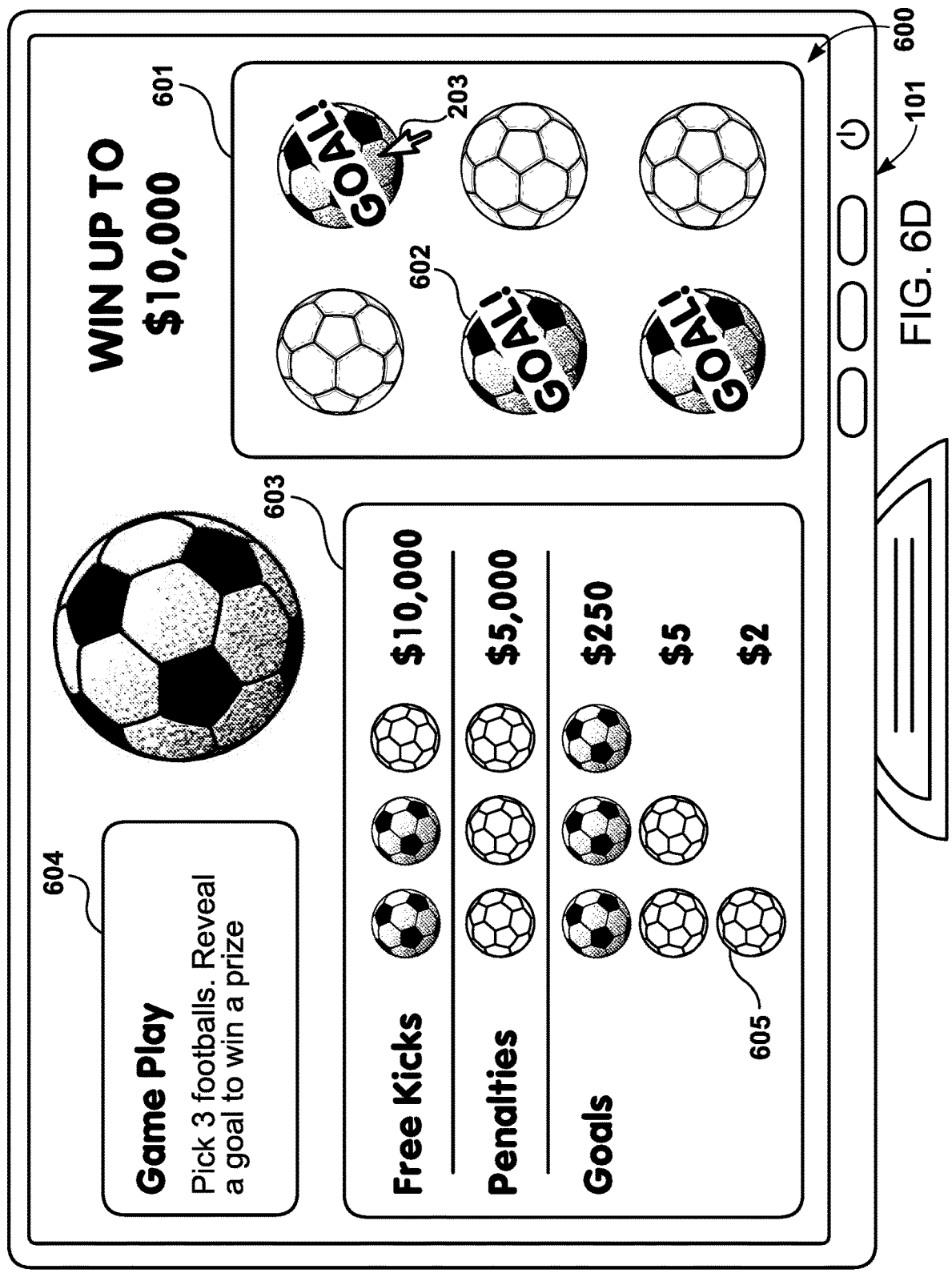
FIG. 6D illustrates an example of the GUI illustrated in FIG. 6A at completion of the virtual scratch-off game.

FIG. 6D illustrates an example of the GUI 600 at completion of the virtual scratch-off game. After selection and activation of various virtual scratch-off indicia 602, corresponding video clips are displayed prior to completion of the virtual scratch-off game; for ease of illustration, only the final virtual scratch-off card 601 is displayed after such multiple iterations. The computing device 101 adjusted the augmented feature illustrated in FIG. 6C to no longer augment the prize table indicium 605 of one soccer ball, but instead highlight the prize table indicia 605 of three soccer balls to accurately reflect the state of the virtual scratch-off game.

Figure 6E:
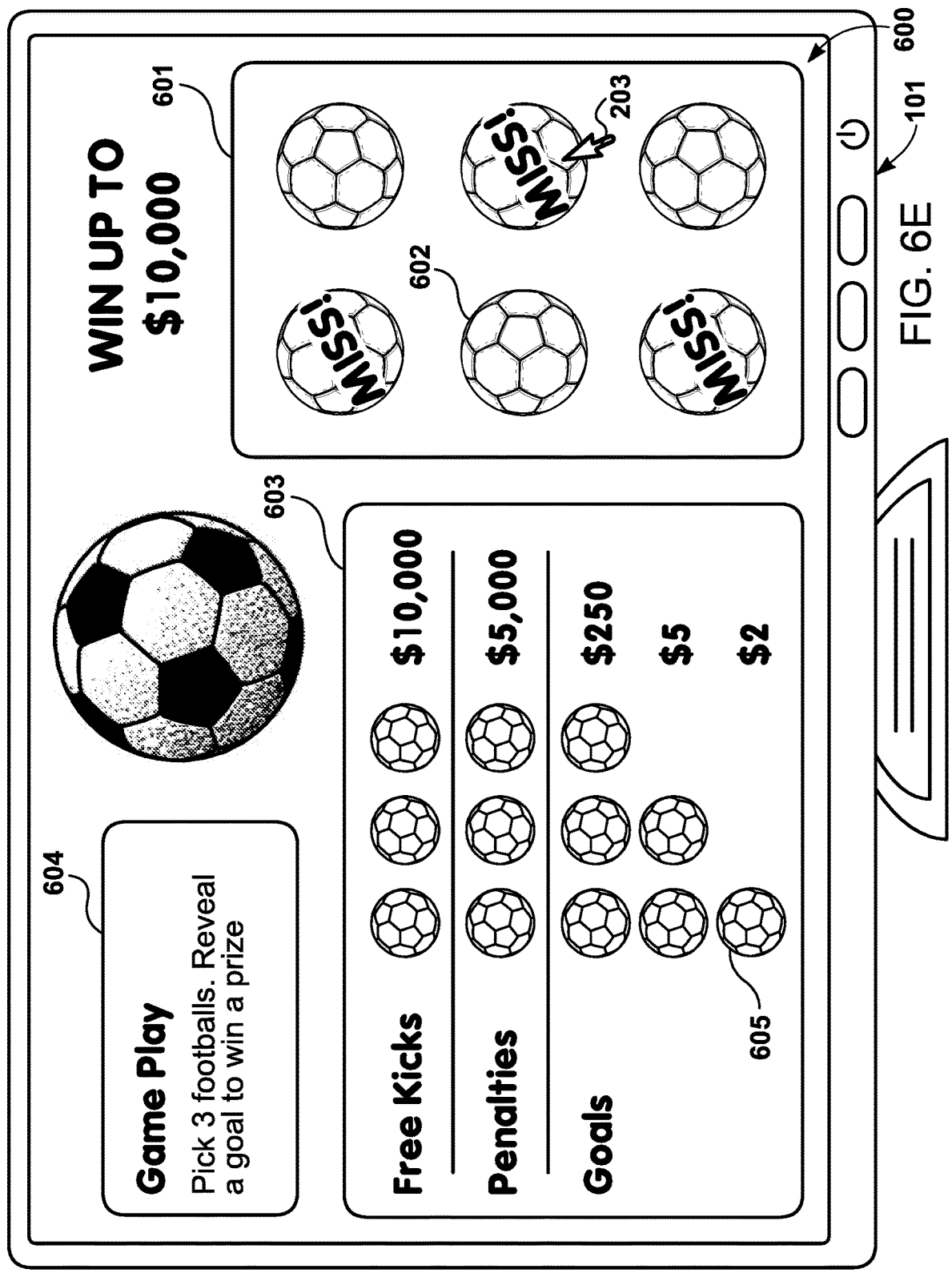
FIG. 6E illustrates an alternative example of the GUI at completion of the virtual scratch-off game illustrated in FIG. 6D.

FIG. 6E illustrates an alternative example of the GUI 600 at completion of the virtual scratch-off game illustrated in FIG. 6D. For example, the events corresponding to the pre-recorded videos resulted in "misses" rather than "goals." Accordingly, the virtual scratch-off indicia 602 are augmented with overlay data to convey "miss," whereas the prize table indicium 605 is not augmented with any feature because no game-winning parameter occurred.

Although the computing device 101 is illustrated in FIGS. 6A-6E as a computer monitor displaying the pointing indicium 203, which may be in operable communication with a device encompassing the processor 106, the computing device 101 may alternatively receive touch-screen inputs (e.g., via a tablet device). The example of a soccer game is provided herein only for illustrative purposes as a variety of other VS-based games, or other types of skill-based games, may be utilized for pre-recorded content in the pre-recorded content database 107. Further, other types of events other than "goal" or "miss" may be utilized in the context of a soccer game, or other VS-based games or skill-based games.

Further, the examples of the virtual scratch grid 201 being a three by three grid and the virtual scratch card grid 601 being a three by two grid were provided only as examples. The virtual scratch grid 201 and/or the virtual scratch card grid 601 may have different dimensions (e.g., five by five) than those illustrated.

A computer is herein intended to include any device that has a general, multi-purpose or single purpose processor as described above. For example, a computer may be a PC, laptop computer, set top box, cell phone, smartphone, tablet device, smart wearable device, portable media player, video player, etc.

It is understood that the apparatuses described herein may also be applied in other types of apparatuses. Those skilled in the art will appreciate that the various adaptations and modifications of the embodiments of the apparatuses described herein may be configured without departing from the scope and spirit of the present computer apparatuses. Therefore, it is to be understood that, within the scope of the appended claims, the present apparatuses may be practiced other than as specifically described herein.

We claim:

1. A computer program product comprising a computer readable storage device having a computer readable program stored thereon, wherein the computer readable program when executed on a computer causes the computer to:
    establish, with a processor, a virtual scratch card game;
    randomly determine, with a processor, a plurality of positions in a virtual scratch card grid that correspond to a winning outcome of the virtual scratch card game;
    search, with the processor, for a plurality of pre-recorded video clips in a pre-recorded content database such that each of the plurality of pre-recorded video clips displays an event corresponding to the winning outcome; and
    provide, with the processor, the plurality of pre-recorded video clips to a display device that renders the virtual scratch card grid according to a plurality of scratch-off blocks that, when activated, reveal each of the plurality of pre-recorded video clips at each of the corresponding plurality of positions, wherein the activation occurs via a swiping action, wherein the plurality of pre-recorded video clips are at least partially rendered according to one or more partial swipes, wherein initiation of playback is determined by the one or more partial swipes exceeding a predetermined scratch-off threshold of one or more portions of the plurality of scratch-off blocks.

2. The computer program product of claim 1, wherein the processor searches the pre-recorded content database according to at least one tag, the at least one tag corresponding to the event.

3. The computer program product of claim 1, wherein the activation occurs via a point action and a click action of an input device.

4. The computer program product of claim 1, wherein the plurality of pre-recorded video clips are rendered according to an activation sequence.

5. The computer program product of claim 1, wherein the plurality of pre-recorded video clips are rendered simultaneously.

6. The computer program product of claim 1, wherein the processor searches a two-dimensional overlay database for content corresponding to the event.

7. The computer program product of claim 6, wherein the processor performs an overlay of the content over one or more of the plurality of pre-recorded video clips.

8. The computer program product of claim 7, wherein the overlay of the content corresponds to game parameter indicia that displays the outcome of the virtual scratch card game according to a prize table.

9. A system comprising:

a pre-recorded content database; and a processor that establishes a virtual scratch card game, randomly determines a plurality of positions in a virtual scratch card grid that correspond to a winning outcome of the virtual scratch card game, searches for a plurality of pre-recorded video clips in the pre-recorded content database such that each of the plurality of pre-recorded video clips displays an event corresponding to the winning outcome, and provides the plurality of pre-recorded video clips to a display device that renders the virtual scratch card grid according to a plurality of scratch-off blocks that, when activated, reveal each of the plurality of pre-recorded video clips at each of the corresponding plurality of positions, wherein the plurality of pre-recorded video clips are rendered simultaneously.

10. The system of claim 9, wherein the processor searches the pre-recorded content database according to at least one tag, the at least one tag corresponding to the event.

11. The system of claim 9, wherein the activation occurs via a point action and a click action of an input device.

12. The system of claim 9, wherein the activation occurs via a swiping action.

13. The system of claim 12, wherein the plurality of pre-recorded video clips are at least partially rendered according to one or more partial swipes.

14. The system of claim 13, wherein initiation of playback is determined by the one or more partial swipes exceeding a predetermined scratch-off threshold of one or more portions of the plurality of scratch-off blocks.

15. The system of claim 9, wherein the plurality of pre-recorded video clips are rendered according to an activation sequence.

16. The system of claim 9, wherein the processor searches a two-dimensional overlay database for content corresponding to the event.

* * * * *